United States Patent
Li et al.

(10) Patent No.: US 11,012,608 B2
(45) Date of Patent: May 18, 2021

(54) PROCESSING METHOD AND MOBILE DEVICE

(71) Applicant: Huawei Technologies Co., Ltd., Shenzhen (CN)

(72) Inventors: Xiaojuan Li, Beijing (CN); Chao Qin, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 16/332,561

(22) PCT Filed: Sep. 12, 2016

(86) PCT No.: PCT/CN2016/098762
§ 371 (c)(1),
(2) Date: Mar. 12, 2019

(87) PCT Pub. No.: WO2018/045596
PCT Pub. Date: Mar. 15, 2018

(65) Prior Publication Data
US 2019/0356861 A1     Nov. 21, 2019

(51) Int. Cl.
*H04N 5/232* (2006.01)
*G06T 7/13* (2017.01)
(Continued)

(52) U.S. Cl.
CPC ....... *H04N 5/232127* (2018.08); *G06T 5/006* (2013.01); *G06T 5/50* (2013.01);
(Continued)

(58) Field of Classification Search
CPC ......... H04N 5/232127; H04N 5/23293; H04N 5/2356; G06T 7/13; G06T 5/50;
(Continued)

(56) References Cited

U.S. PATENT DOCUMENTS

2006/0222260 A1* 10/2006 Sambongi ............. G06T 5/50
382/274
2007/0132862 A1    6/2007 Akasawa
(Continued)

FOREIGN PATENT DOCUMENTS

CN        102611822 A    7/2012
CN        102855472 A    1/2013
(Continued)

OTHER PUBLICATIONS

Jagannathan, L., et al., "Perspective Correction Methods for Camera-Based Document Analysis," XP055105117, Proceedings of the First International Workshop on Camera-Based Document Analysis and Recognition, Aug. 29, 2005, pp. 148-154.
(Continued)

*Primary Examiner* — Xi Wang
(74) *Attorney, Agent, or Firm* — Conley Rose, P.C.

(57) ABSTRACT

A processing method, which includes receiving a photographing instruction in order to trigger a camera to photograph a target document, identifying four sides of a document image corresponding to the target document, determining a first included angle corresponding to the document image, where the first included angle represents an inclination degree of the document image relative to the target document, triggering the camera to reset a focus location in a direction of far-end content in the document image, and taking n pictures when the first included angle is greater than a preset threshold, applying geometric correction to the pictures obtained through photographing, outputting one of the pictures to which geometric correction has been applied. Hence, the method significantly increase definition of the far-end content in the document image, and improve correction quality of the document image.

20 Claims, 18 Drawing Sheets

(51) Int. Cl.
*G06T 5/00* (2006.01)
*H04W 88/02* (2009.01)
*G06T 5/50* (2006.01)

(52) U.S. Cl.
CPC ...... *G06T 7/13* (2017.01); *G06T 2207/20221* (2013.01); *G06T 2207/30176* (2013.01); *H04W 88/02* (2013.01)

(58) Field of Classification Search
CPC ......... G06T 5/006; G06T 2207/20201; H04W 88/02; G03B 13/36; G03B 3/00–12; G02B 7/04–105
USPC .......................................... 348/231.99, 222.1
See application file for complete search history.

(56) References Cited

U.S. PATENT DOCUMENTS

| | | | |
|---|---|---|---|
| 2008/0226171 A1 | 9/2008 | Yin et al. | |
| 2010/0045942 A1 | 2/2010 | Furui | |
| 2010/0135595 A1 | 6/2010 | Du et al. | |
| 2011/0285874 A1* | 11/2011 | Showering | H04N 1/00718 348/231.99 |
| 2012/0219222 A1* | 8/2012 | Ferman | G06K 9/3233 382/173 |
| 2013/0343609 A1 | 12/2013 | Wilson et al. | |
| 2014/0072201 A1* | 3/2014 | Tilt | G06T 1/0007 382/140 |
| 2014/0092272 A1* | 4/2014 | Choi | H04N 5/23293 348/222.1 |
| 2015/0229838 A1* | 8/2015 | Hakim | H04N 5/23222 348/333.02 |
| 2015/0244931 A1* | 8/2015 | Ichikawa | H04N 5/2621 348/239 |
| 2017/0026546 A1* | 1/2017 | Ito | H04N 1/3873 |
| 2017/0352132 A1 | 12/2017 | Zhang et al. | |
| 2018/0184012 A1* | 6/2018 | Kanatsu | G06K 9/20 |

FOREIGN PATENT DOCUMENTS

| | | |
|---|---|---|
| CN | 103888654 A | 6/2014 |
| CN | 105007413 A | 10/2015 |
| CN | 105791660 A | 7/2016 |
| CN | 103888654 B | 9/2018 |
| JP | 2007166009 A | 6/2007 |
| JP | 2010050542 A | 3/2010 |

OTHER PUBLICATIONS

Liang, J., et al., "Camera-based analysis of text and documents: a survey," XP055564069, International Journal on Document Analysis and Recognition, vol. 7, No. 2-3, Jul. 1, 2005, pp. 84-104.
Foreign Communication From a Counterpart Application, European Application No. 16915530.6, Extended European Search Report dated Aug. 22, 2019, 10 pages.
Machine Translation and Abstract of Chinese Publication No. CN102855472, Jan. 2, 2013, 6 pages.
Machine Translation and Abstract of Chinese Publication No. CN103888654, Jun. 25, 2014, 15 pages.
Machine Translation and Abstract of Chinese Publication No. CN105007413, Oct. 28, 2015, 32 pages.
Foreign Communication From a Counterpart Application, PCT Application No. PCT/CN2016/098762, English Translation of International Search Report dated Jun. 5, 2017, 2 pages.
Foreign Communication From a Counterpart Application, PCT Application No. PCT/CN2016/098762, English Translation of Written Opinion dated Jun. 5, 2017, 4 pages.
Machine Translation and Abstract of Chinese Publication No. CN103888654, Sep. 7, 2018, 15 pages.

* cited by examiner (A) (B)

PROCESSING METHOD AND MOBILE DEVICE

CROSS-REFERENCE TO RELATED APPLICATIONS

This application is a U.S. National Stage of International Patent Application No. PCT/CN2016/098762 filed on Sep. 12, 2016, which is hereby incorporated by reference in its entirety.

TECHNICAL FIELD

The present invention relates to the field of image processing technologies, and in particular, to a processing method and a mobile device.

BACKGROUND

A user may take a photograph or record a video by using a mobile device having a photographing function (for example, a camera, a mobile phone, a wearable device, or a network camera). For example, in a conference room, people may photograph, at any time, information on a whiteboard, a slide, a document, or another material by using a mobile phone, and do not need to write down the information. This is quite convenient.

However, when such a mobile device is used to photograph an object, there is usually a specific included angle between an image plane of a camera and a photographed plane due to limitation of a factor such as a photographing distance or angle. This leads to relatively large image distortion. For example, a to-be-photographed object that is actually rectangular is possibly distorted into an arbitrary quadrilateral, such as a trapezoid. Such distortion is referred to as oblique distortion.

FIG. 1A and FIG. 1B show document images that are corresponding to a rectangular document and that have oblique distortion. Referring to FIG. 1A, the distorted document image is photographed at a relatively small inclination angle. The document image shown in FIG. 1A is an arbitrary quadrilateral rather than a rectangle. In addition, a font of a far-end character is smaller than a font of a near-end character. Worse, referring to FIG. 1B, the distorted document image is photographed at a relatively large inclination angle. Compared with the document image shown in FIG. 1A, a shape of the document image shown in FIG. 1B is even less like a rectangle. In addition, a far-end character in the document image shown in FIG. 1B is quite fuzzy and is difficult to recognize.

With respect to oblique distortion, some existing smartphones provide a document correction function in a photographing function.

The document correction function can well correct a distorted document image that is obtained through photographing at a relatively small inclination angle (for example, less than 15°). However, for a distorted document image obtained through photographing at a relatively large inclination angle (for example, greater than 50°), far-end content of a document image corrected by using the existing document correction function has relatively low definition.

SUMMARY

Embodiments of the present invention provide a processing method and a mobile device, so as to significantly increase definition of far-end content in a document image and improve correction quality of the document image.

According to a first aspect, a processing method is provided. The processing method is applied to a mobile device, and includes: receiving, by the mobile device, a photographing instruction; determining, through edge detection, four sides of a document image corresponding to a target document in a preview box of the mobile device; determining, based on the four sides, a first included angle corresponding to the document image; if the first included angle is greater than a preset threshold, triggering a camera to reset a focus location in a direction close to far-end content in the document image, and take n pictures (n is an integer not less than 1); applying geometric correction to at least one of the n pictures obtained through photographing; and using, as output in response to the photographing instruction, one of the at least one picture to which geometric correction has been applied.

Specifically, the first included angle may be used to represent an inclination degree of the document image relative to the target document. The first included angle is positively correlated with an inclination angle of an image plane of the camera relative to the target document.

In specific implementation, the first included angle may be an included angle formed between two lateral sides adjacent to a main side of a quadrilateral. Herein, the main side is a side closest to the camera in the four sides. It should be noted that the first included angle may alternatively be another angle corresponding to the document image, and is not limited to the included angle formed between the two lateral sides adjacent to the main side, provided that the first included angle can reflect an inclination degree of the image plane of the camera relative to the target document.

In this embodiment of the present invention, the mobile device may determine the first included angle according to the following several implementations.

In a first implementation, the mobile device may obtain lengths of the four sides $k_1$, $k_2$, $k_3$, and $k_4$, where $k_1$ and $k_3$ are opposite sides, $k_1/k_3 \geq 1$, $k_2$ and $k_4$ are opposite sides, and $k_2/k_4 \geq 1$. Then, the mobile device calculates side ratios of the two pairs of opposite sides: $k_1/k_3$ and $k_2/k_4$. The mobile device determines $k_1$ as a main side if $k_1/k_3$ is greater than $k_2/k_4$, or determines $k_2$ as a main side if $k_2/k_4$ is greater than $k_1/k_3$. Finally, the mobile device may determine, as the first included angle, an included angle formed by intersection of two lateral sides of the determined main side.

In a second implementation, the mobile device may obtain lengths of the four sides $k_1$, $k_2$, $k_3$, and $k_4$, where $k_1$ and $k_3$ are opposite sides, and $k_2$ and $k_4$ are opposite sides. The mobile device calculates a second included angle formed between the opposite sides $k_1$ and $k_3$ and a third included angle formed between the opposite sides $k_2$ and $k_4$. Finally, the mobile device may determine, as the first included angle, the larger of the second included angle and the third included angle.

In this embodiment of the present invention, the mobile device may reset a photographing focus according to the following several implementations.

In some embodiments, the mobile device may calculate an angle difference between the first included angle and the preset threshold (for example, 50°), then determine a moving distance d of the focus based on the angle difference, and finally, move the focus the moving distance d in a direction close to a far end.

For example, the mobile device moves the focus one unit quantity toward the far-end content each time when the angle difference increases by 5°. In specific implementation, the unit quantity may be a physical quantity that represents a distance, for example, 1 centimeter. The unit quantity may be alternatively represented by using a pixel value, for example, 80 dpi is one unit quantity. It should be noted that the moving distance d of the focus may alternatively be a fixed value.

In some embodiments, the mobile device may move, on a central axis of the document image, the focus toward a far end. H is a length of the central axis. The mobile device may finally set the focus location to a location that is at a distance of r*H from the main side, where r represents a ratio, and 0<r<1. In specific implementation, a larger first included angle may indicate a larger ratio r. That is, larger oblique distortion indicates a shorter distance between the focus location and the far end of the document image. This can better improve far-end definition for a seriously distorted document image.

In actual application, the ratio r may alternatively be a fixed value, for example, r=2/3. That is, regardless of an oblique distortion degree, the focus location is set by default to a location that is at a distance of 2H/3 from the main side.

In this embodiment of the present invention, after resetting the focus location, the mobile device may take a picture and apply image correction according to the following several implementations, to improve image correction quality.

In an embodiment, after resetting the focus location, the mobile device may take one picture (n=1). Then, the mobile device may apply geometric correction to the picture obtained through photographing, to restore a geometric ratio of a document image in the picture.

In an embodiment, after resetting the focus location, the mobile device may take a plurality of pictures (n≥2), and then apply geometric correction to the plurality of pictures obtained through photographing.

In an implementation, to further improve far-end definition of the document image, image segmentation and image splicing operations may be further performed after geometric correction is applied to the picture obtained through photographing. Specific steps may be as follows:

Step 1: Divide, into m image blocks, each of at least two of the n (n≥2) pictures to which geometric correction has been applied, where m≥2, and m is a positive integer.

Step 2: With respect to a same image block, select, from the at least two pictures, an image block with highest definition as a to-be-spliced image block.

Finally, m selected to-be-spliced image blocks are spliced into one picture, and the picture obtained through splicing is used as the output in response to the photographing instruction.

In another implementation, to further improve far-end definition of the document image, image segmentation and image splicing operations may be further performed before geometric correction is applied to the picture obtained through photographing. Specific steps may be as follows:

Step 1: Divide, into m image blocks, each of at least two of the n (n≥2) pictures obtained through photographing, where m≥2, and m is a positive integer.

Step 2: With respect to a same image block, select, from the at least two pictures, an image block with highest definition as a to-be-spliced image block.

Step 3: Splice m selected to-be-spliced image blocks into one picture.

Finally, geometric correction is applied to the picture obtained through splicing, and the picture to which geometric correction has been applied is used as the output in response to the photographing instruction.

To avoid impairment of near-end definition of the document image while improving the far-end definition of the document image, this embodiment of the present invention provides the following implementations.

In some embodiments, the mobile device may move the photographing focus a plurality of times in the direction close to the far-end content in the document image, sequentially obtain, through photographing, the n (n≥2) pictures in a process of moving the focus, and then apply geometric correction and perform the image segmentation and image splicing operations by using the pictures obtained through photographing.

It can be understood that, when a picture is taken in an initial phase of focus moving, the focus is still relatively close to near-end content, and image definition near the near-end content is still relatively high. Therefore, when the image segmentation and image splicing operations are performed on the plurality of pictures obtained through photographing, a to-be-spliced image block of the near-end content may be selected from the picture taken in the initial phase. In this way, near-end definition of a picture obtained through splicing is less affected by focus moving.

In some embodiments, before resetting the location of the photographing focus, the mobile device may further take one or more pictures.

It can be understood that, because a picture has been taken before the photographing focus is reset, near-end definition of the picture taken before the photographing focus is reset is not affected by focus moving, and the definition is quite high. Therefore, when the image segmentation and image splicing operations are performed by using all pictures obtained through photographing (including the picture taken before focus resetting and the n pictures), a to-be-spliced image block of near-end content may be selected from the picture taken before focus resetting. In this way, near-end definition of a picture obtained through splicing is not affected by focus moving.

According to the method described in the first aspect, when the document image has relatively serious oblique distortion, the focus is reset in the direction close to the far-end content in the document image, and the picture is taken. This can not only restore a geometric ratio of the document image, but also significantly increase definition of the far-end content in the document image and improve correction quality of the document image.

According to a second aspect, a processing method is provided. The processing method includes: receiving, by a mobile device, a photographing instruction; determining, through edge detection, four sides of a document image corresponding to a target document in a preview box of the mobile device; determining, based on the four sides, a first included angle corresponding to the document image, if the first included angle is greater than a preset threshold, triggering a camera to take k pictures (k≥2, and k is a positive integer); applying image correction to the k pictures obtained through photographing; and using, as output in response to the photographing instruction, one picture obtained through image correction.

Specifically, image correction may be used for improving far-end definition of the document image, so that far-end definition of the picture obtained through image correction is higher than the far-end definition that the document image has before image correction is applied.

In an implementation, a specific process in which the mobile device performs image correction by using the k pictures may be as follows.

Step 1: Apply geometric correction to at least two of the k pictures.

Step 2: Divide, into m image blocks, each of the at least two pictures to which geometric correction has been applied, where m≥2, and m is a positive integer.

Step 3: With respect to a same image block, select, from the at least two pictures, an image block with highest definition as a to-be-spliced image block.

Finally, m selected to-be-spliced image blocks are spliced, and one picture obtained through splicing is used as the output in response to the photographing instruction.

In another implementation, a specific process in which the mobile device performs image correction by using the k pictures may be as follows:

Step 1: Divide each of at least two of the k pictures into m image blocks, where m≥2, and m is a positive integer.

Step 2: With respect to a same image block, select, from the at least two pictures, an image block with highest definition as a to-be-spliced image block.

Step 3: Perform image splicing on m selected to-be-spliced image blocks, and use, as the output, one picture obtained through splicing.

Finally, geometric correction is applied to the one picture obtained through splicing, and the picture to which geometric correction has been applied is used as the output in response to the photographing instruction.

Specifically, for specific implementation of determining the first included angle by the mobile device, refer to related content in the method described in the first aspect. Details are not described herein again.

According to the method described in the second aspect, when the camera takes the k pictures, slight jitter of the camera causes the k pictures obtained through photographing to present different far-end definition. Far-end content of some of the pictures is clearer.

Therefore, when image segmentation and image splicing operations are performed by using the k pictures obtained through photographing, an image block with highest definition may be selected from the k pictures as a to-be-spliced image block. This can improve definition of far-end content in the document image.

With reference to the first aspect, or with reference to the second aspect, in some embodiments, if the mobile device determines that the first included angle is less than the preset threshold, the mobile device may apply geometric correction to the document image.

It can be understood that a far-end fuzziness phenomenon of the document image is not obvious when oblique distortion is not serious. In this case, a geometric ratio of the document image may be restored by using geometric correction only.

According to a third aspect, a processing method is provided. The processing method includes: receiving, by a mobile device, a photographing instruction; determining that an included angle formed between two lateral sides adjacent to a main side in four sides of a document image is greater than a preset threshold; triggering a camera to take k pictures (k≥2, and k is a positive integer); using at least two of the k pictures as input, and applying geometric correction or image correction to the at least two pictures; and using, as output in response to the photographing instruction, one picture obtained through image correction. Herein, the main side is a side closest to the camera in the four sides.

Specifically, the image correction may include: applying geometric correction to the at least two pictures, and dividing, into m image blocks (m≥2, and m is a positive integer), each of the at least two pictures to which geometric correction has been applied; with respect to a same image block, selecting, from the at least two pictures, an image block with highest definition as a to-be-spliced image block; and splicing m selected to-be-spliced image blocks into one picture, and using, as the output in response to the photographing instruction, the picture obtained through splicing.

In some embodiments, the image correction may alternatively include: dividing each of the at least two pictures into m image blocks (m≥2, and m is a positive integer); with respect to a same image block, selecting, from the at least two pictures, an image block with highest definition as a to-be-spliced image block; splicing m selected to-be-spliced image blocks into one picture; and applying geometric correction to the picture obtained through splicing, and using, as the output in response to the photographing instruction, the picture to which geometric correction has been applied.

It should be noted that, for how to determine that the included angle formed between the two lateral sides adjacent to the main side in the four sides of the document image is greater than the preset threshold, reference may be made to related descriptions about how to determine whether the first included angle is greater than the preset threshold in the first aspect. Details are not described herein again.

According to a fourth aspect, a processing method is provided. The processing method includes: receiving, by a mobile device, a photographing instruction; determining that an included angle formed between two lateral sides adjacent to a main side in four sides of a document image is greater than a preset threshold; taking s pictures (s is a positive integer); taking q pictures (q is a positive integer) after resetting a location of a photographing focus; using, as input, at least two of the s+q pictures obtained through photographing, and applying geometric correction or image correction to the at least two pictures; and using, as output in response to the photographing instruction, one picture obtained through image correction.

Specifically, the image correction may include: applying geometric correction to the at least two pictures, and dividing, into m image blocks (m≥2, and m is a positive integer), each of the at least two pictures to which geometric correction has been applied; with respect to a same image block, selecting, from the at least two pictures, an image block with highest definition as a to-be-spliced image block; and splicing m selected to-be-spliced image blocks into one picture, and using, as the output in response to the photographing instruction, the picture obtained through splicing.

In some embodiments, the image correction may alternatively include: dividing each of the at least two pictures into m image blocks (m≥2, and m is a positive integer); with respect to a same image block, selecting, from the at least two pictures, an image block with highest definition as a to-be-spliced image block; splicing m selected to-be-spliced image blocks into one picture; and applying geometric correction to the picture obtained through splicing, and using, as the output in response to the photographing instruction, the picture to which geometric correction has been applied.

It should be noted that, for details about resetting the location of the photographing focus, reference may be made to related content in the first aspect, and details are not described herein again. For how to determine that the included angle formed between the two lateral sides adjacent to the main side in the four sides of the document image is greater than the preset threshold, reference may be made to related descriptions about how to determine whether the first included angle is greater than the preset threshold in the first aspect, and details are not described herein again.

According to a fifth aspect, a processing method is provided. The processing method includes: receiving, by a mobile device, a photographing instruction; determining that an included angle formed between two lateral sides adjacent to a main side in four sides of a document image is greater than a preset threshold; taking n pictures (n is a positive integer) after resetting a location of a photographing focus; using, as input, at least one of the n pictures obtained through photographing, and applying geometric correction to the at least one picture; and using, as output in response to the photographing instruction, one picture to which geometric correction has been applied.

Specifically, when geometric correction is applied, image segmentation and image splicing operations may further be performed to further improve far-end definition of the document image. For details, refer to specific implementation of further improving the far-end definition of the document image in the first aspect.

Further, to avoid impairment of near-end definition of the document image while improving the far-end definition of the document image, in some embodiments, the mobile device may move the photographing focus a plurality of times in a direction close to far-end content in the document image, sequentially obtain, through photographing, the n (n≥2) pictures in a process of moving the focus, and then perform image correction by using the plurality of pictures obtained through photographing.

It should be noted that, for how to determine that the included angle formed between the two lateral sides adjacent to the main side in the four sides of the document image is greater than the preset threshold, reference may be made to related descriptions about how to determine whether the first included angle is greater than the preset threshold in the first aspect. Details are not described herein again.

According to a sixth aspect, a processing method is provided. The processing method includes: receiving, by a mobile device, a photographing instruction; determining an included angle formed between two lateral sides adjacent to a main side in four sides of a document image; and if the included angle is greater than a preset threshold, using the processing method described in the fourth aspect, the fifth aspect, or the sixth aspect; or if the included angle is not greater than a preset threshold, taking one picture, and applying geometric correction to the picture.

According to a seventh aspect, a mobile device is provided, and the mobile device is configured to implement the method described in the first aspect, the fourth aspect, or the fifth aspect. The mobile device may include a user input apparatus, a processor, and a camera. The user input apparatus is configured to receive a photographing instruction. The camera is configured to obtain a document image of a target document. The processor is configured to determine, through edge detection, four sides of the document image corresponding to the target document in a preview box of the mobile device. The processor is further configured to determine, based on the four sides, a first included angle corresponding to the document image. The processor is further configured to: determine whether the first included angle is greater than a preset threshold; and if the first included angle is greater than the preset threshold, trigger the camera to reset a focus location in a direction close to far-end content in the document image and take n pictures (n is an integer not less than 1). The processor is further configured to apply geometric correction to at least one of the n pictures obtained through photographing, and use, as output in response to the photographing instruction, one of the at least one picture to which geometric correction has been applied.

Specifically, the first included angle may be used to represent an inclination degree of the document image relative to the target document. The first included angle is positively correlated with an inclination angle of an image plane of the camera relative to the target document. For a definition and a determining manner of the first included angle, refer to related content in the first aspect. Details are not described herein again.

According to an eighth aspect, a mobile device is provided, and the mobile device is configured to implement the method described in the second aspect or the third aspect. The mobile device may include a user input apparatus, a processor, and a camera. The user input apparatus is configured to receive a photographing instruction. The camera is configured to obtain a document image of a target document. The processor is configured to determine, through edge detection, four sides of the document image corresponding to the target document in a preview box of the mobile device. The processor is further configured to determine, based on the four sides, a first included angle corresponding to the document image. The processor is further configured to: determine whether the first included angle is greater than a preset threshold, and if the first included angle is greater than the preset threshold, trigger the camera to take k pictures (k≥2, and k is a positive integer). The processor is further configured to apply image correction by using the k pictures taken by the camera, and use, as output in response to the photographing instruction, one picture obtained through image correction. Far-end content in the picture obtained through image correction is clearer than far-end content in the document image.

Specifically, the first included angle may be used to represent an inclination degree of the document image relative to the target document. The first included angle is positively correlated with an inclination angle of an image plane of the camera relative to the target document. For a definition and a determining manner of the first included angle, refer to related content in the first aspect. Details are not described herein again.

According to a ninth aspect, a mobile device is provided, and the mobile device is configured to implement the method described in the sixth aspect. The mobile device may include a user input apparatus, a processor, and a camera. The user input apparatus is configured to receive a photographing instruction. The camera is configured to obtain a document image of a target document. The processor is configured to determine an included angle formed between two lateral sides adjacent to a main side in four sides of the document image. If the included angle is greater than a preset threshold, the processor performs the processing method described in the fourth aspect, the fifth aspect, or the sixth aspect. If the included angle is not greater than a preset threshold, the processor triggers the camera to take one picture, and applies geometric correction to the picture.

According to a tenth aspect, a mobile device is provided. The mobile device includes one or more processors, a memory, a bus system, a transceiver, and one or more programs. The processor, the memory, and the transceiver are connected to each other by using the bus system. The one or more programs are stored in the memory. The one or more programs include an instruction. When executed by the portable electronic device, the instruction causes the portable electronic device to perform the method described in any one of the first aspect to the sixth aspect.

According to an eleventh aspect, a mobile device is provided, and the mobile device includes a functional unit configured to perform the method described in the first aspect, the fourth aspect, or the fifth aspect.

According to a twelfth aspect, a mobile device is provided, and the mobile device includes a functional unit configured to perform the method described in the second aspect or the third aspect.

According to a thirteenth aspect, a mobile device is provided, and the mobile device includes a functional unit configured to perform the method described in the sixth aspect.

According to a fourteenth aspect, a readable nonvolatile storage medium that stores a computer instruction is provided, and the computer instruction is executed by the mobile device described in the seventh aspect, to implement the method described in the first aspect, the fourth aspect, or the fifth aspect.

According to a fifteenth aspect, a readable nonvolatile storage medium that stores a computer instruction is provided, and the computer instruction is executed by the mobile device described in the eighth aspect, to implement the method described in the second aspect or the third aspect.

According to a sixteenth aspect, a readable nonvolatile storage medium that stores a computer instruction is provided, and the computer instruction is executed by the mobile device described in the ninth aspect, to implement the method described in the sixth aspect.

According to a seventeenth aspect, a computer readable storage medium that stores one or more programs is provided. The one or more programs include an instruction. When executed by a portable electronic device, the instruction causes the portable electronic device to perform the method described in any one of the first aspect to the sixth aspect.

According to an eighteenth aspect, a graphical user interface on a mobile device is provided. The mobile device includes a display, a memory, a plurality of application programs, and one or more processors configured to execute one or more programs stored in the memory. The graphical user interface includes a user interface displayed in performing the method described in any one of the first aspect to the sixth aspect.

Implementation of the embodiments provided in the present invention can significantly increase the definition of the far-end content in the document image, and improve correction quality of the document image.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Terms used in an implementation part of the present invention are merely intended to explain specific embodiments of the present invention, but are not intended to limit the present invention.

For ease of understanding of the embodiments of the present invention, oblique distortion and geometric correction related to the embodiments of the present invention are described first.

Figure 1A:
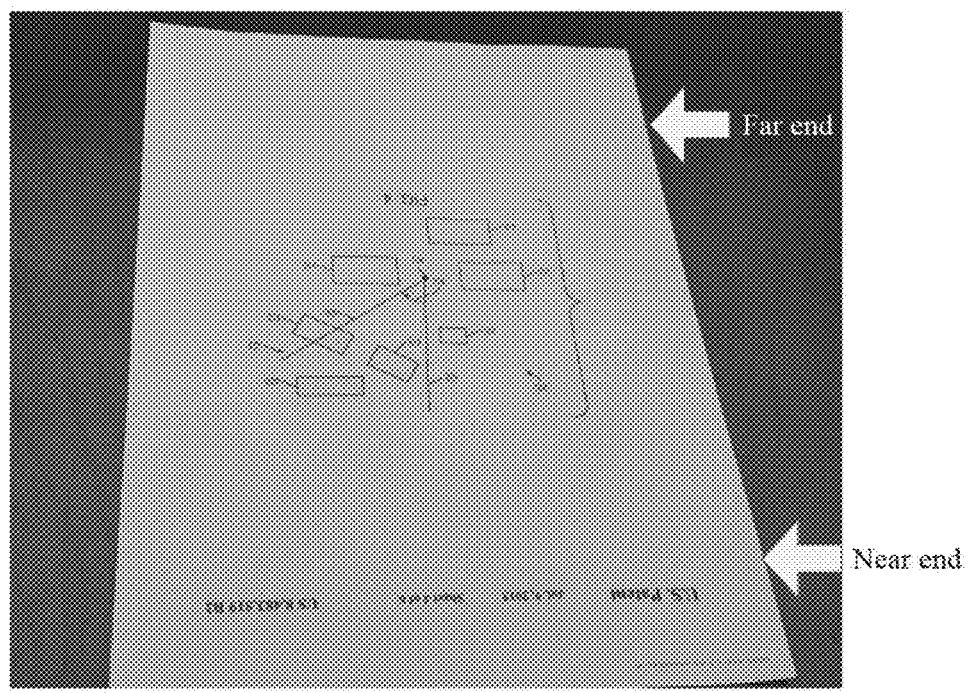
FIG. 1A and FIG. 1B are schematic diagrams of document images that have oblique distortion when a target document is photographed.
Figure 1B:
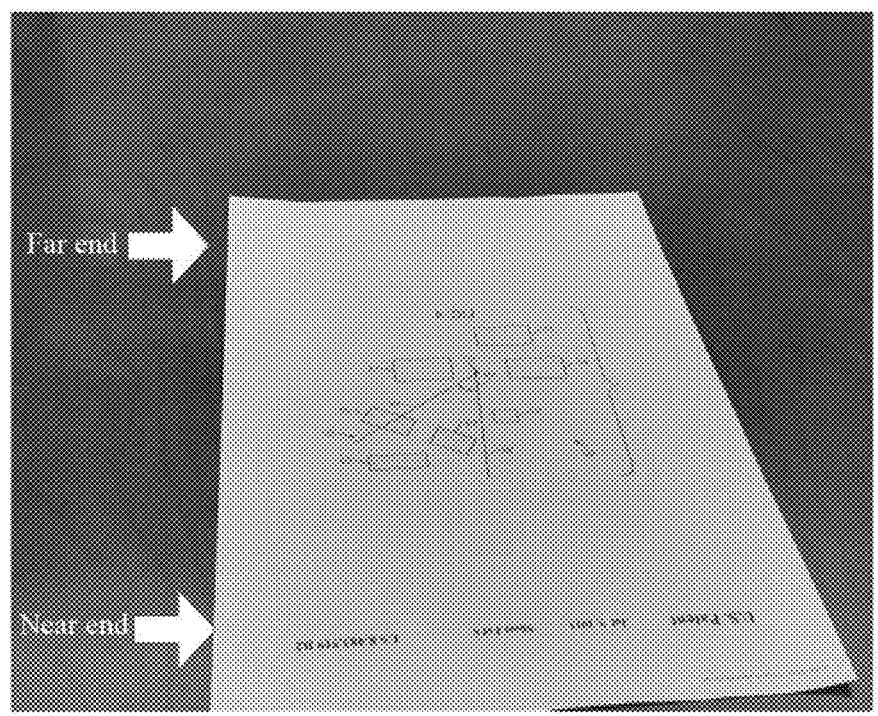
Figure 2A:
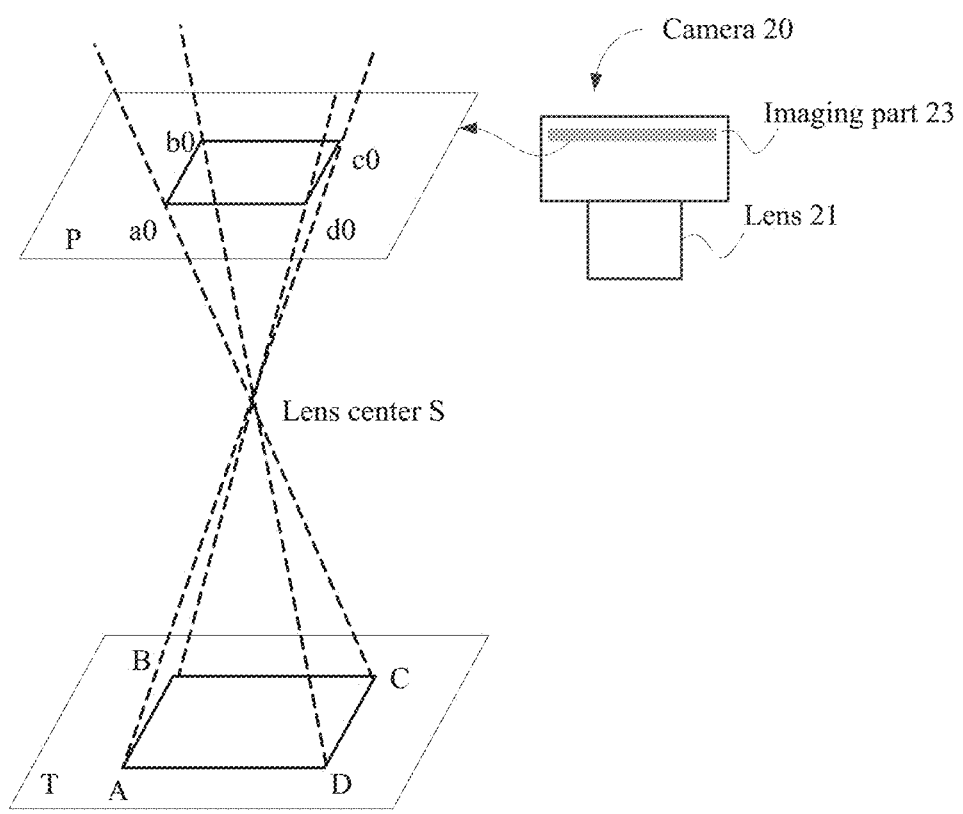
FIG. 2A is a schematic diagram of a photographing scenario without oblique distortion.
Figure 2B:
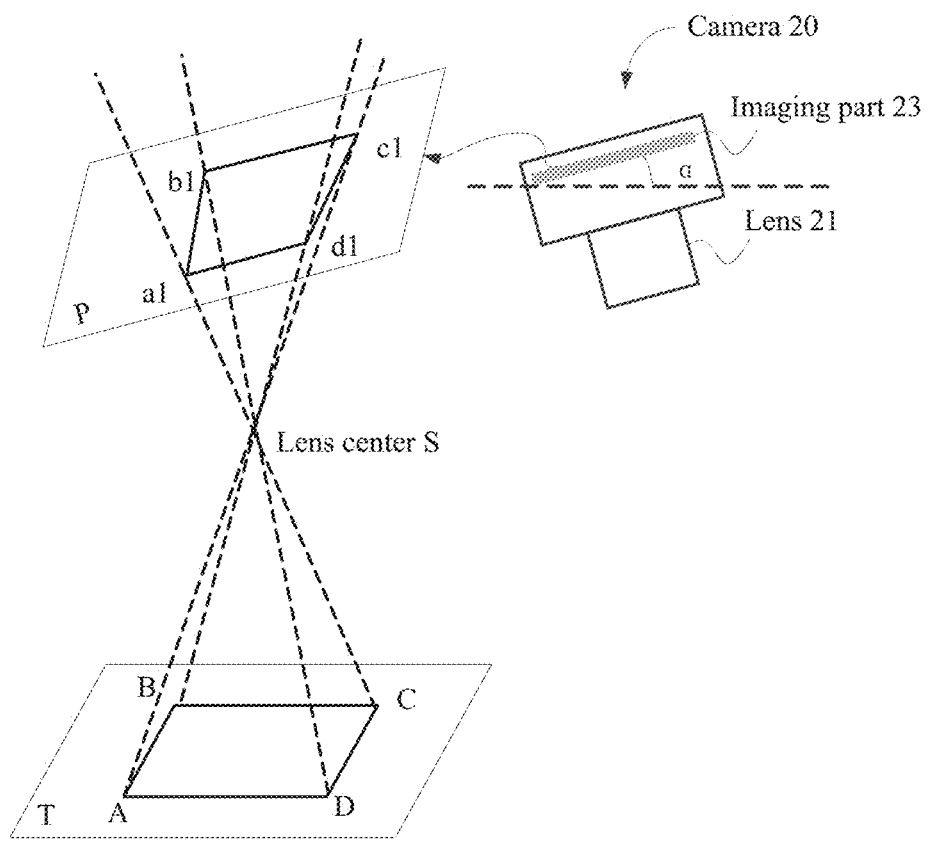
FIG. 2B is a schematic diagram of a photographing scenario with oblique distortion.

FIG. 2A and FIG. 2B show a photographing scenario without oblique distortion and a photographing scenario with oblique distortion, respectively. A camera 20 may include a lens 21 and an imaging part 23. An optical center of the lens 21 is shown as a lens center S in the figure. The imaging part 23 may be a CCD, a CMOS, or another imaging part. A rectangular target document ABCD is placed on a horizontal reference plane T, and a document image corresponding to the target document ABCD is on an image plane P. The image plane P is a plane on which the imaging part 23 is located.

In the photographing scenario without oblique distortion shown in FIG. 2A, the image plane P of the camera 20 is parallel to the horizontal reference plane T on which the target document ABCD is located. A document image $a_0 b_0 c_0 d_0$ finally imaged on the image plane P along an optical path represented by a dashed line in FIG. 2A is also a rectangle. In addition, a geometric ratio of the target document ABCD is reconstructed in the document image $a_0 b_0 c_0 d_0$. The photographing scenario shown in FIG. 2A is an ideal scenario of document photographing, and there is no oblique distortion in the document image obtained through photographing.

In the photographing scenario with oblique distortion shown in FIG. 2B, the image plane P of the camera 20 is not parallel to the horizontal reference plane T on which the target document ABCD is located. There is an included angle α between the image plane P and the horizontal reference plane T. For a document image $a_1b_1c_1d_1$ imaged on the imaging plane P, a convergence effect is caused due to an optical perspective principle "an object looks big when near and small when in a distance". That is, content closer to the lens 21 in the document image $a_1b_1c_1d_1$ is larger, and content farther from the lens 21 in the document image $a_1b_1c_1d_1$ is smaller. The finally imaged document image $a_1b_1c_1d_1$ may be a distorted arbitrary quadrilateral, for example, a trapezoid.

It can be understood that, according to the optical perspective principle "an object looks big when near and small when in a distance", content, for example, a word, closer to the lens 21 in the document image $a_1b_1c_1d_1$ is displayed in a larger size, and content, for example, a word, farther from the lens 21 in the document image $a_1b_1c_1d_1$ is displayed in a smaller size. That is, far-end content in the document image is fuzzier. In addition, a larger included angle α between the image plane P and the target document ABCD indicates that oblique distortion of the document image $a_1b_1c_1d_1$ is more serious, a shape of the document image $a_1b_1c_1d_1$ is less like a rectangle, and far-end content in the document image $a_1b_1c_1d_1$ is fuzzier.

It should be noted that a target document in the embodiments of the present invention may be a rectangular information presentation object, such as rectangular text, a rectangular whiteboard, a rectangular slide, or a rectangular display screen configured to display information.

The following describes geometric correction related to the embodiments of the present invention. A precondition for the geometric correction is: In an image plane coordinate system, coordinates of four vertexes of a document image that is possibly presented as an arbitrary quadrilateral are known. It should be understood that lengths and directions of four sides of the document image on an image plane can be identified through edge detection.

Therefore, coordinates of all points (including the four vertexes) in the document image can also be known.

Figure 3:
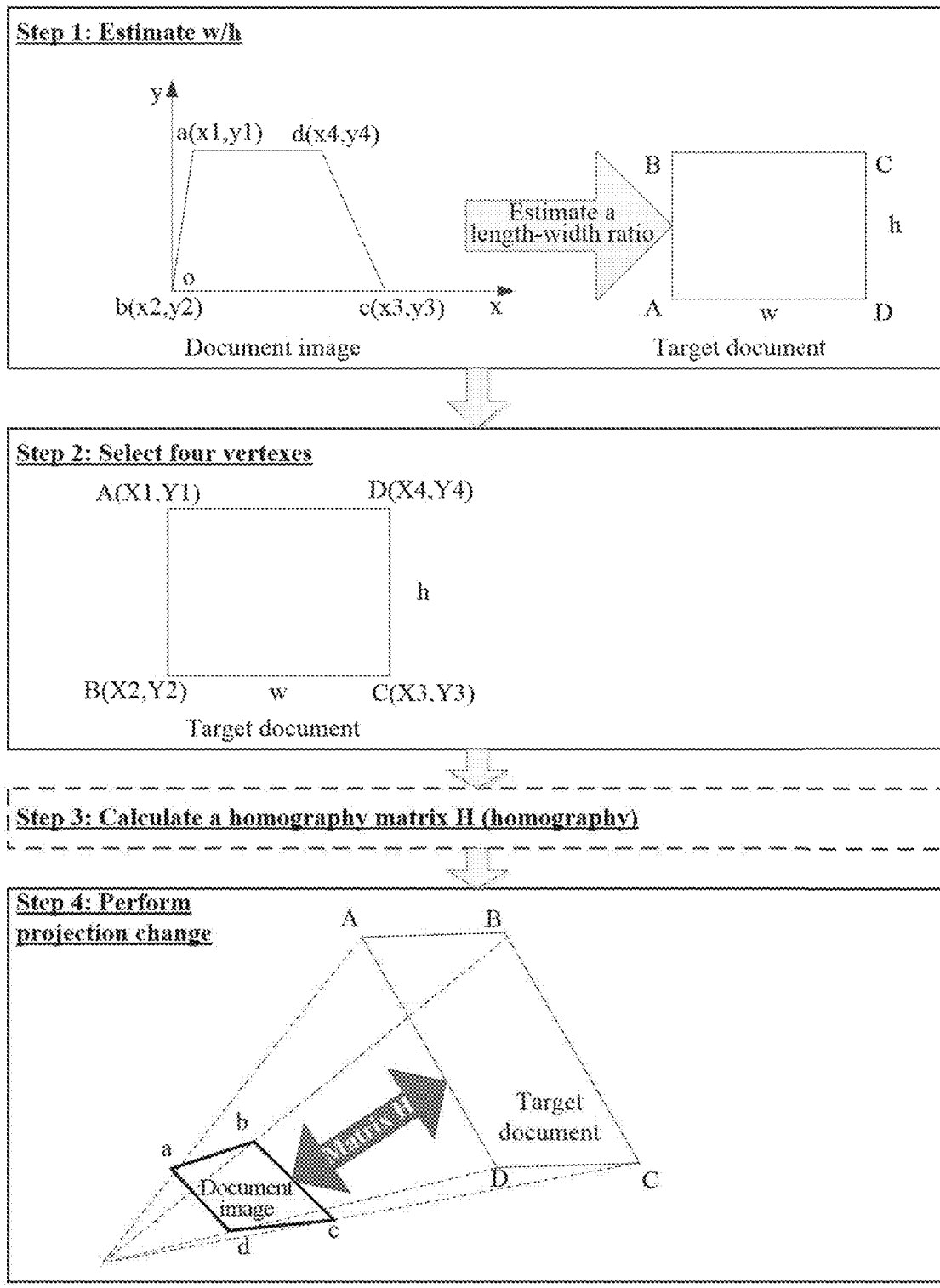
FIG. 3 is a schematic diagram of a geometric correction method related to an embodiment of the present invention.

In an embodiment of the present invention, referring to FIG. 3, a method for performing geometric correction on a document image is as follows:

Step 1: Estimate an original length-width ratio w/h of a target document based on four vertexes (a,b,c,d) of the document image. Due to projection homography, a length-width ratio of a rectangular photographed object corresponding to a known quadrilateral image can be estimated based on the image. For details, refer to US patent [U.S. Pat. No. 7,171,056]. Details are not described herein.

Step 2: Select four coordinate points (A, B, C, D) as four vertexes of the target document based on the estimated original length-width ratio w/h. The selected four coordinate points satisfy the original length-width ratio. It should be noted that a rectangle constituted by the four coordinate points merely reconstructs the length-width ratio of the target document, but is not necessarily equivalent to the target document in area or size.

Step 3: Calculate a homography matrix H based on the four vertexes of the document image and the four vertexes of the target document. The homography matrix H is used to represent conversion between an image plane coordinate system in which the document image is located and a horizontal reference plane coordinate system in which the target document is located. For details about how to solve the homography matrix H, refer to US patent [U.S. Pat. No. 8,503,813]. Details are not described herein.

Step 4: Perform projection transformation on the document image based on the homography matrix H, to restore a geometric ratio of the document image. A projection transformation formula is $\hat{m}=sH\tilde{M}$, where $\hat{m}$ represents a point in the document image, $\tilde{M}$ represents a point in the target document, $\hat{m}=[x\ y\ 1]^T=[X\ Y\ 1\ Z]^T$, and s is an arbitrary ratio. It can be learned that a point $\tilde{M}$, in the target document, to which an arbitrary point $\hat{m}$ in the document image is correspondingly projected can be known based on the homography matrix H.

That is, when the document image is known (that is, coordinates of all points in the document image are known), a rectangular document image can be restored by performing the foregoing process. The rectangular document image obtained through correction reconstructs the target document in ratio. In specific implementation, a value of s may be determined based on an actual requirement, to set a size of the corrected document image.

The embodiments of the present invention provide the processing method, so as to significantly increase definition of far-end content in the document image and improve correction quality of the document image. Herein, the far-end content is content, in the document image, relatively far from a camera.

A main principle used in the embodiments of the present invention includes: During photographing of a target document (a to-be-photographed object), if a relatively large inclination angle is found between an image plane of a camera and the target document through analysis, the camera is triggered to enter a preset photographing mode. The preset photographing mode is used to improve a document image far-end fuzziness status caused by the relatively large inclination angle.

For the preset photographing mode, the embodiments of the present invention provide the following two solutions:

Solution 1: The camera is triggered to move a photographing focus to the far-end content in the document image and take a picture, and finally, image correction is applied to the picture obtained through photographing, to obtain a corrected document image.

Solution 2: The camera is triggered to take a plurality of pictures, and image correction is applied to the plurality of pictures, to obtain a corrected document image.

The following describes the processing method provided in the embodiments of the present invention with reference to the accompanying drawings.

Figure 4:
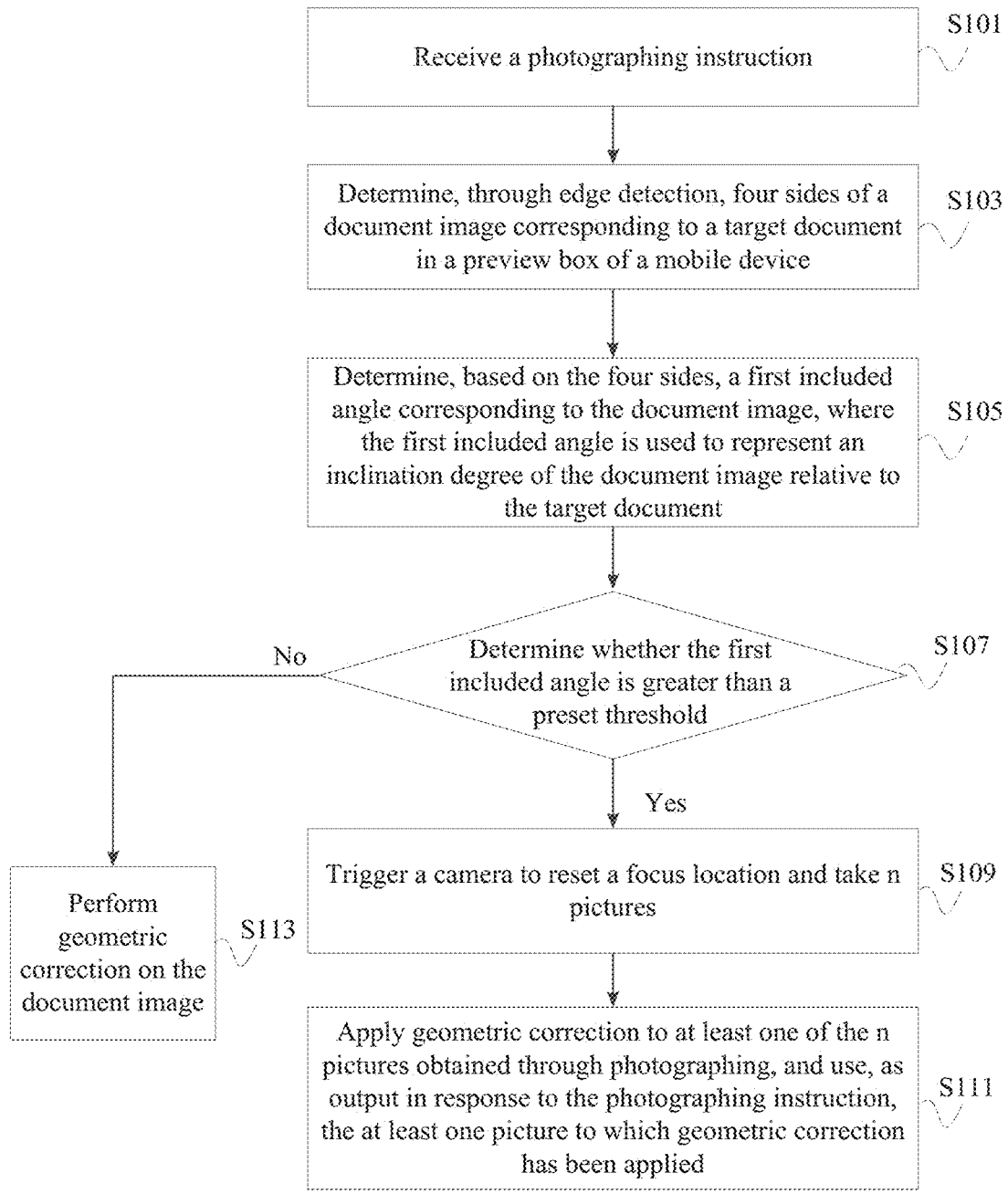
FIG. 4 is a schematic flowchart of a processing method according to an embodiment of the present invention.

FIG. 4 shows a processing method according to an embodiment of the present invention. In the embodiment in FIG. 4, during photographing of a target document, if a relatively large inclination angle is found between an image plane of a camera and the target document through analysis, the camera is triggered to enter the preset photographing mode described in the foregoing Solution 1. Steps S101 to S103 are performed by a mobile device or at least one processor in a mobile device. The mobile device includes but is not limited to a mobile phone, a camera, a wearable device, or a network camera. The following provides descriptions by using an example in which the mobile device is an execution body.

S101: The mobile device receives a photographing instruction.

In specific implementation, the photographing instruction may be triggered by a user by pressing a specified physical button. For example, the user presses a photographing button on a side of the mobile phone to trigger photographing of the target document. The photographing instruction may alternatively be triggered by a user by touching a virtual button. For example, after starting a photographing application program, the user touches a virtual shutter to trigger photographing of the target document. The photographing instruction may alternatively be triggered by a user in another application program (different from a photographing application program). For example, when using a social application, the user may trigger photographing of the target document by sharing a photo. The examples are merely some implementations of this embodiment of the present invention, and an implementation in actual application may be different from these implementations. This shall not constitute any limitation.

S103: The mobile device determines, through edge detection, four sides $k_1$, $k_2$, $k_3$, and $k_4$ of a document image corresponding to the target document in a preview box of the mobile device. It should be understood that lengths and directions of the four sides of the document image on the image plane can be identified through edge detection. Therefore, coordinates of all points (including four vertexes) in the document image can also be known.

S105: The mobile device determines, based on the four sides, a first included angle corresponding to the document image, where the first included angle may be used to represent an inclination degree of the document image relative to the target document. Specifically, the first included angle is positively correlated with a photographing inclination angle. The photographing inclination angle is an inclination angle of the image plane of the camera relative to the target document. Referring to content in FIG. 2A and FIG. 2B, it can be learned that the image plane of the camera is a plane on which the document image is located, and the photographing inclination angle is the included angle α in FIG. 2A and FIG. 2B.

S107: The mobile device determines whether the first included angle is greater than a preset threshold. In specific implementation, the preset threshold may be set based on experience. In actual use, both photographing light and optical configurations of the camera may affect setting of the preset threshold.

Specifically, if the first included angle is greater than the preset threshold, execution of step S109 is triggered; if the first included angle is not greater than the preset threshold, execution of step S103 is triggered.

S109: The mobile device triggers the camera to reset a focus location in a direction close to far-end content in the document image, and take n pictures (n is an integer not less than 1). In this embodiment of the present invention, resetting the focus location may be moving a photographing focus toward far-end content in the document image. In this way, definition of the far-end content can be improved.

It should be understood that, if the first included angle is greater than the preset threshold, for example, 70°, it indicates that oblique distortion of the document image is relatively serious. In this case, the photographing mode described in the foregoing Solution 1 may be triggered, to improve a document image far-end fuzziness status.

S101: The mobile device applies geometric correction to at least one of the n pictures obtained through photographing, and uses, as output in response to the photographing instruction, one of the at least one picture to which geometric correction has been applied. For specific implementation of geometric correction, refer to content described in FIG. 3. Details are not described herein again. It can be understood that, because the picture is taken after the focus location is reset, far-end definition of the picture obtained through photographing is improved in comparison with far-end definition of the document image.

S103: The mobile device applies geometric correction to the document image. For specific implementation of geometric correction, refer to content described in FIG. 3. It can be understood that a far-end fuzziness phenomenon of the document image is not obvious when oblique distortion is not serious. In this case, a geometric ratio of the document image may be restored by using geometric correction only.

It should be noted that the mobile device in steps S101 to S103 may be replaced by a processor in the mobile device, and details are not described herein.

In this embodiment of the present invention, the first included angle may be an included angle formed between two lateral sides adjacent to a main side of the quadrilateral. Herein, the main side is a side closest to the camera in the four sides.

Figure 5:
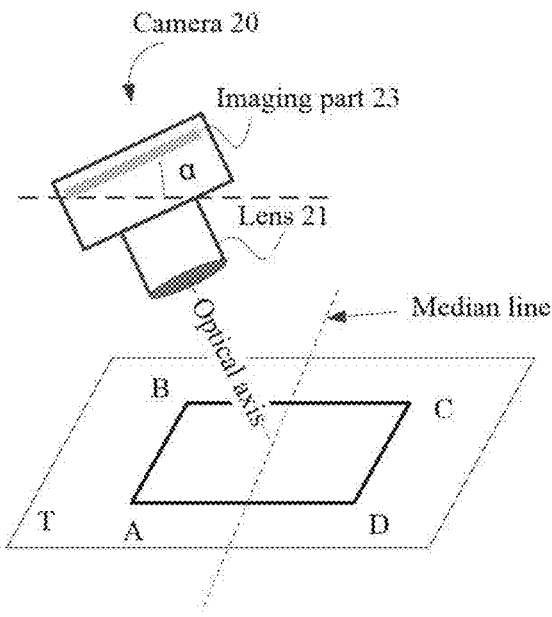
FIG. 5 is a schematic diagram of a relationship between oblique distortion and a geometric shape of a document image.
Figure 5:
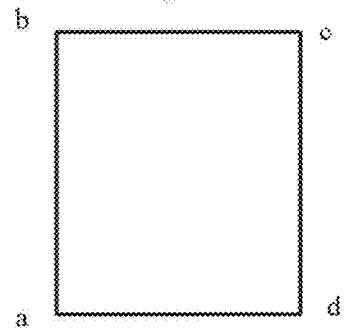
Figure 5:
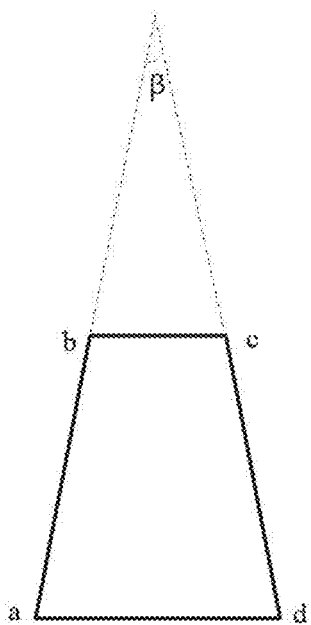
Figure 5:
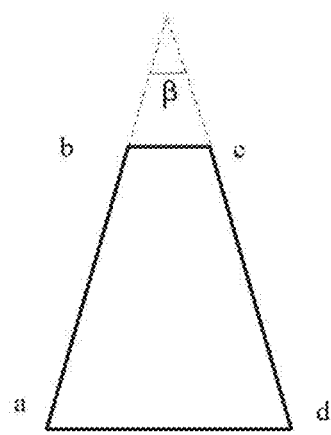

For example, in a photographing scenario shown in FIG. 5, an optical axis of a camera 20 and a median line of a target document ABCD are located on a midperpendicular plane of the target document ABCD. It should be understood that a document image abcd obtained through photographing in a scenario in which an inclination angle α is 0 is a rectangle, and all document images abcd obtained through photographing at different inclination angles α (α≠0) are distorted into an isosceles trapezoid. A main side of the document image abcd is ad, and a first included angle corresponding to the document image abcd is an included angle β. It can be seen from FIG. 5 that a larger inclination angle α indicates a larger included angle β. That is, an included angle formed between two lateral sides adjacent to the main side may be used to represent the inclination degree of the image plane of the camera relative to the target image.

The following provides detailed descriptions about how to determine, based on the four sides, the first included angle corresponding to the document image.

In a first implementation, a method for determining the first included angle by the mobile device may include: obtaining lengths of the four sides $k_1$, $k_2$, $k_3$, and $k_4$, where $k_1$ and $k_3$ are opposite sides, $k_1/k_3 \geq 1$, $k_2$ and $k_4$ are opposite sides, and $k_2/k_4 \geq 1$; calculating side ratios of the two pairs of opposite sides: $k_1/k_3$ and $k_2/k_4$; determining $k_1$ as the main side if $k_1/k_3$ is greater than $k_2/k_4$, or determining $k_2$ as the main side if $k_2/k_4$ is greater than $k_1/k_3$; and determining, as the first included angle, an included angle formed by intersection of the two lateral sides of the main side.

Figure 6A:
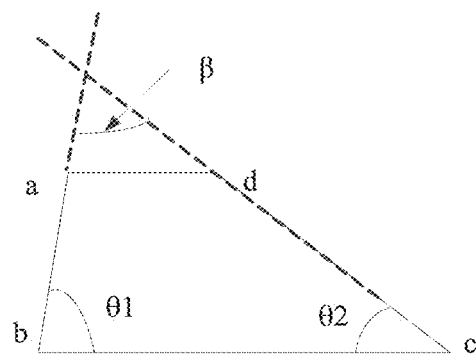
FIG. 6A is a schematic diagram of a method for determining a first included angle according to an embodiment of the present invention.

As shown in FIG. 6A, it is assumed that the main side determined according to the foregoing implementation is bc. In this case, an included angle β formed by intersection of ab and cd is the first included angle. A calculation process of the included angle β may be as follows:

(1) According to a cosine formula of an included angle between two vectors, the following can be obtained:

$$\cos\theta 1 = \frac{\vec{ba} \cdot \vec{bc}}{|\vec{ba}| \cdot |\vec{bc}|}, \text{ and } \cos\theta 2 = \frac{\vec{cb} \cdot \vec{cd}}{|\vec{cb}| \cdot |\vec{cd}|}$$

In this way, an included angle θ1 and an included angle θ2 can be calculated.

(2) Then, according to a geometric theorem that a sum of interior angles of a triangle is equal to 180°, the following can be calculated:

$$\beta=180°-(\theta1+\theta2)$$

In a second implementation, a method for determining the first included angle by the mobile device may include: obtaining lengths of the four sides $k_1$, $k_2$, $k_3$, and $k_4$, where $k_1$ and $k_3$ are opposite sides, and $k_2$ and $k_4$ are opposite sides; calculating a second included angle formed between the opposite sides $k_1$ and $k_3$ and a third included angle formed between the opposite sides $k_2$ and $k_4$; and determining, as the first included angle, the larger of the second included angle and the third included angle.

Figure 6B:
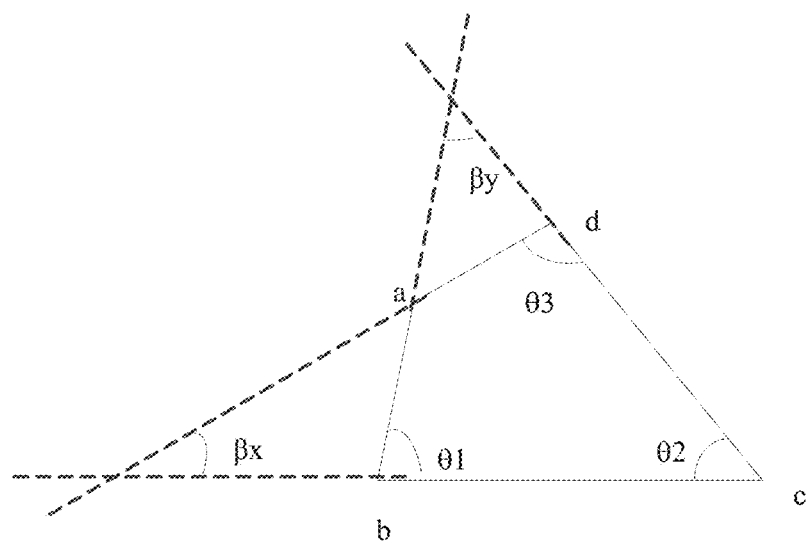
FIG. 6B is a schematic diagram of another method for determining a first included angle according to an embodiment of the present invention.
Figure 7:
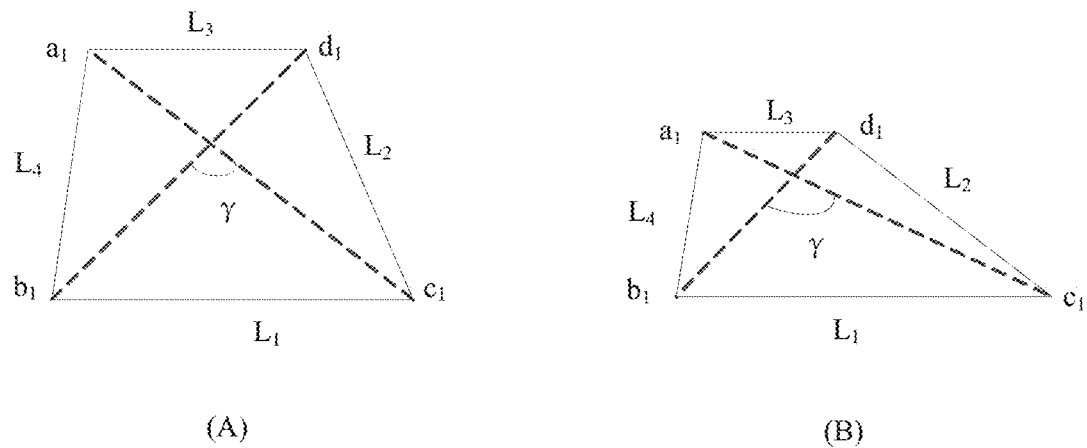
FIG. 7 is a schematic diagram of an optional embodiment of a first included angle according to an embodiment of the present invention.

As shown in FIG. 6B, it is assumed that the second included angle is $\beta x$, and the third included angle is $\beta y$. A calculation process of the included angle $\beta x$ and the included angle $\beta y$ may be as follows:

(1) According to a cosine formula of an included angle between two vectors, the following can be obtained:

$$\cos\theta1 = \frac{\vec{ba}\cdot\vec{bc}}{|\vec{ba}|\cdot|\vec{bc}|},\ \cos\theta2 = \frac{\vec{cb}\cdot\vec{cd}}{|\vec{cb}|\cdot|\vec{cd}|},\ \text{and}\ \cos\theta3 = \frac{\vec{da}\cdot\vec{dc}}{|\vec{da}|\cdot|\vec{dc}|}.$$

(2) Then, according to a geometric theorem that a sum of interior angles of a triangle is equal to 180°, the following can be calculated:

$$\beta x=180°-(\theta2+\theta3),\ \text{and}\ \beta y-180°-(\theta1+\theta2).$$

In a calculation result of FIG. 6B, if $\beta x>\beta y$, $\beta x$ is determined as the first included angle, and the main side is cd; if $\beta y>\beta x$, $\beta y$ is determined as the first included angle, and the main side is bc.

It should be noted that, because coordinates of the four vertexes of the document image can be determined through edge detection, vectors of all sides related to the foregoing cosine formulas are all known.

The following briefly describes principles related to the foregoing two implementations for determining the first included angle.

As shown in FIG. 5, if there is no oblique distortion ($\alpha=0$), the document image abcd should reconstruct the target document ABCD in geometric ratio, and the document image abcd should be a rectangle. Side length ratios corresponding to two pairs of opposite sides of the document image abcd should both be 1 (because bc=ad and ab=cd), and included angles formed by the two pairs of opposite sides should both be 0 (because bc∥ad and ab∥cd).

As shown in FIG. 5, if there is oblique distortion ($\alpha\neq0$), a perspective phenomenon that "an object looks big when near and small when in a distance" occurs.

In the document image abcd, an opposite-side length ratio deviates from 1. In comparison with a side length ratio ab/cd between the two lateral sides (ab and cd) (ab/cd=1 in FIG. 5), a side length ratio between the main side ad and an opposite side be of the main side distorts more seriously. Therefore, the main side may be determined from a pair of opposite sides with a side length ratio that distorts more seriously, and a longer side in the pair of opposite sides is determined as the main side. Then, an included angle formed between two lateral sides adjacent to the main side is determined as the first included angle. In the foregoing first implementation, such a phenomenon in an oblique distortion scenario is applied.

In addition, in the document image abcd, the included angle formed between the two lateral sides (ab and cd) is greater than an included angle formed between the main side ad and the opposite side be of the main side. Particularly, in FIG. 5, the included angle formed between the main side ad and the opposite side be of the main side is 0. In addition, it can be seen from FIG. 5 that the included angle formed between the two lateral sides (ab and cd) increases with an increase in the inclination degree. Therefore, the included angles formed by the two pairs of opposite sides may be separately calculated, and then, the larger included angle is determined as the first included angle. In the foregoing second implementation, such a phenomenon in an oblique distortion scenario is applied.

In some possible implementations, the first included angle in this embodiment of the present invention may alternatively be another angle corresponding to the arbitrary quadrilateral corresponding to the document image, and is not limited to the included angle formed between the two lateral sides adjacent to the main side defined in the foregoing content, provided that the first included angle can reflect the inclination degree of the image plane of the camera relative to the target document.

For example, in FIG. 6, it is assumed that the main side is $k_1$. The first included angle may alternatively be an included angle $\gamma$ formed by intersection of two diagonals of the arbitrary quadrilateral corresponding to the document image. From a comparison between FIG. (A) and FIG. (B), it can be learned that more serious oblique distortion indicates a larger included angle $\gamma$. It can be understood that $k_1/k_3$ in FIG. (B) is larger, and the ratio is more deviated from 1. Therefore, oblique distortion in FIG. (B) is more serious than oblique distortion in FIG. (A).

If the first included angle obtained through calculation in the foregoing manner is greater than the preset threshold (50°), the camera may be triggered to enter the preset photographing mode described in the foregoing Solution 1, to improve a document image far-end fuzziness status. The following provides detailed descriptions.

In the preset photographing mode described in the foregoing Solution 1, as shown in FIG. 8, the mobile device may reset the focus location in the direction close to the far-end content in the document image. It should be understood that the definition of the far-end content can be improved by moving the photographing focus to the far-end content in the document image.

Figure 8A:
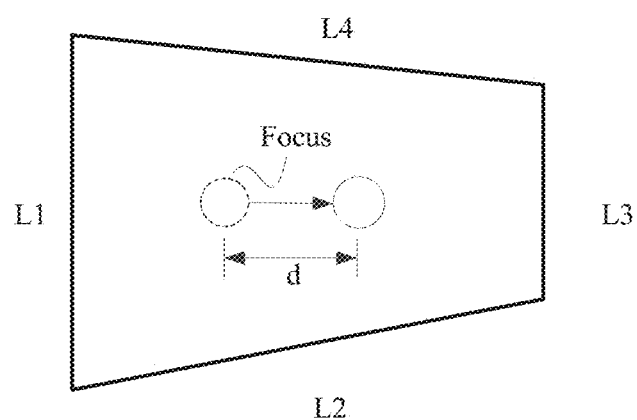
FIG. 8A and FIG. 8B are schematic diagrams of focus location resetting according to an embodiment of the present invention.

As shown in FIG. 8A, during focus location resetting, a moving distance d of the focus may be correlated with the first included angle, so that the focus location is set based on different inclination degrees, to adapt to different degrees of far-end fuzziness in the document image.

In some embodiments, the mobile device may calculate an angle difference between the first included angle and the preset threshold (for example, 50°), and then determine the moving distance d of the focus based on the angle difference. For example, the mobile device moves the focus one unit quantity toward the far-end content each time when the angle difference increases by 5°. In specific implementation, the unit quantity may be a physical quantity that represents a distance, for example, 1 centimeter. The unit quantity may be alternatively represented by using a pixel value, for example, 80 dpi is one unit quantity. It should be noted that the moving distance d of the focus may alternatively be a fixed value.

Figure 8B:
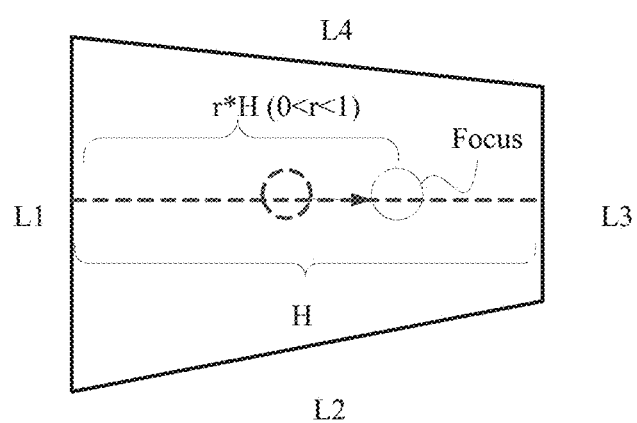

In some embodiments, the mobile device may move, on a central axis of the document image, the focus toward a far end. H is a length of the central axis. The focus location may be finally set to a location that is at a distance of r*H from the main side, where r represents a ratio, and 0<r<1. As shown in FIG. 8B, it is assumed that the main side is $k_1$, and a dashed line represents the central axis of the document image. It should be understood that, usually, a smaller value of H indicates more serious oblique distortion of the document image.

In specific implementation, a larger first included angle may indicate a larger ratio r. That is, larger oblique distortion indicates a shorter distance between the focus location and the far end of the document image. This can better improve far-end definition for a seriously distorted document image. For example, if the first included angle is 30°, the focus may be set at a location that is at a distance of 2H/3 (r=2/3) from the main side $k_1$. If the first included angle is 50°, the focus may be set at a location that is at a distance of 4H/5 (r=4/5) from the main side $k_1$. The examples are merely used to describe this embodiment of the present invention, but shall not constitute any limitation.

In actual application, the ratio r may alternatively be a fixed value, for example, r=2/3. That is, regardless of an oblique distortion degree, the focus location is set by default to a location that is at a distance of 2H/3 from the main side $k_1$.

The following provides detailed descriptions about how to apply image correction based on a picture obtained through photographing after focus location resetting, to improve image correction quality.

In an embodiment, after resetting the focus location, the mobile device may take one picture (n=1). Then, the mobile device may apply geometric correction by using the picture obtained through photographing, to restore a geometric ratio of a document image in the picture. For specific implementation of geometric correction, refer to content described in FIG. 3. Details are not described herein again. It can be understood that, because the picture is taken after the focus location is reset, far-end definition of the document image is improved.

In an embodiment, after resetting the focus location, the mobile device may take a plurality of pictures (n≥2). Then, the mobile device may apply image correction by using the plurality of pictures obtained through photographing. In specific implementation, a quantity of the plurality of pictures may be correlated with an oblique distortion degree of the document image. That is, more serious oblique distortion indicates that more pictures may be taken. How to determine a specific quantity of the plurality of pictures is not limited in this embodiment of the present invention. In some embodiments, the mobile device may select, from the plurality of pictures, one picture with highest far-end definition as output in response to the photographing instruction.

In an implementation, to further improve the far-end definition of the document image, if n≥2, the mobile device may further perform image segmentation and image splicing operations when applying geometric correction to the picture obtained through photographing. Specific steps may be as follows:

Step 1: Divide, into m image blocks, each of at least two pictures to which geometric correction has been applied, where m≥2, and m is a positive integer.

Step 2: With respect to a same image block, select, from the at least two pictures, an image block with highest definition as a to-be-spliced image block.

Finally, m selected to-be-spliced image blocks are spliced into one picture, and the picture obtained through splicing is used as the output in response to the photographing instruction.

Figure 9:
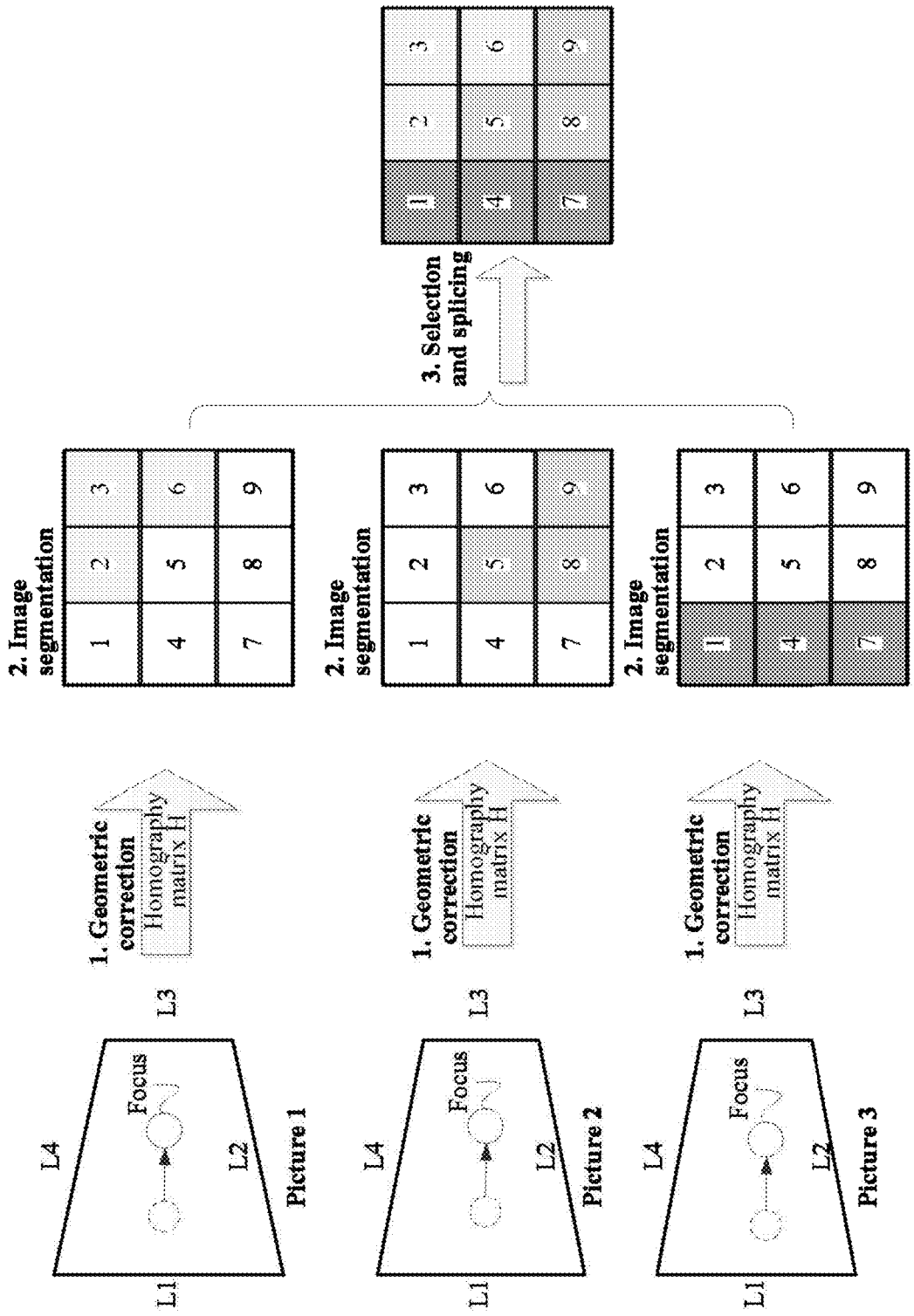
FIG. 9 is a schematic diagram of a method for performing image correction by using a plurality of pictures according to an embodiment of the present invention.

For example, as shown in FIG. 9, it is assumed that n=3 and m=9. First, geometric correction is applied to each of three pictures, to restore a geometric ratio of a document image in the picture. Then, for an image block whose number is 1, an image block with highest definition is selected from the three pictures as a to-be-spliced image block that is finally used for image splicing. For example, for image blocks whose numbers are 1 to 3, image blocks 1 to 3 in a picture 3 has highest definition, and therefore, the image blocks 1 to 3 in the picture 3 are selected as to-be-spliced image blocks. Similarly, image blocks 2, 3, and 6 in a picture 1 are selected as to-be-spliced image blocks, and image blocks 5, 8, and 9 in the picture 1 are selected as to-be-spliced image blocks. Finally, these to-be-spliced image blocks are spliced.

In another implementation, to further improve the far-end definition of the document image, if n≥2, the mobile device may further perform image segmentation and image splicing operations when applying geometric correction to the picture obtained through photographing. Specific steps may be as follows:

Step 1: Divide, into m image blocks, each of at least two of the n (n≥2) pictures obtained through photographing, where m≥2, and m is a positive integer.

Step 2: With respect to a same image block, select, from the at least two pictures, an image block with highest definition as a to-be-spliced image block.

Step 2: Splice m selected to-be-spliced image blocks into one picture.

Finally, geometric correction is applied to the picture obtained through splicing, and the picture to which geometric correction has been applied is used as the output in response to the photographing instruction.

In some embodiments, the mobile device may alternatively perform image segmentation and image splicing operations in FIG. 9 on only a partial area in the picture, for example, an area near the far-end content. For example, in FIG. 9, only image blocks 3, 6, and 9 with highest definition are selected from the three pictures, and image splicing is performed on the selected image blocks 3, 6, and 9, to improve definition of far-end content.

It can be understood that the far-end definition of the document image can be further improved by performing both geometric correction and the image segmentation and image splicing operations on the picture obtained through photographing. If an image block splicing manner shown in FIG. 9 is used, that is, an entire picture is segmented and then image blocks are spliced, overall definition of the document image can be improved.

It should be noted that FIG. 9 is merely an example provided in this embodiment of the present invention and is used to describe this embodiment of the present invention, but shall not constitute any limitation.

To avoid impairment of near-end definition of the document image while improving the far-end definition of the document image, this embodiment of the present invention provides the following implementations.

Figure 10:
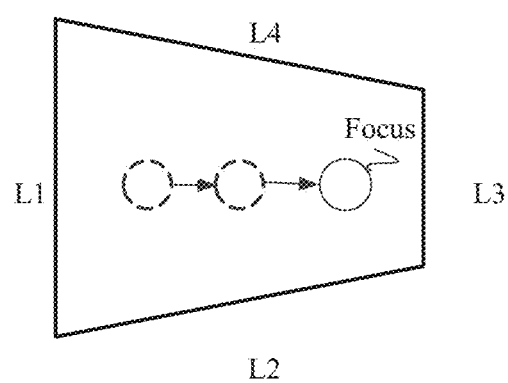
FIG. 10 is a schematic diagram of another focus moving method according to an embodiment of the present invention.

In some embodiments, as shown in FIG. 10, the mobile device may move the photographing focus a plurality of times in the direction close to the far-end content in the document image, and sequentially obtain, through photographing, the n (n≥2) pictures in a process of moving the focus.

The three pictures shown in FIG. 9 are used as an example. The picture 1 is taken after the first time of focus moving, the picture 2 is taken after the second time of focus moving, and the picture 3 is taken after the third time of focus moving. When the picture 1 is taken, the focus is still relatively close to near-end content, and image definition near the near-end content is still relatively high. Therefore, when the image segmentation and image splicing operations are performed on the three pictures, a to-be-spliced image block of the near-end content may be selected from the picture 1. In this way, near-end definition of a picture obtained through splicing is less affected by focus moving.

Figure 11:
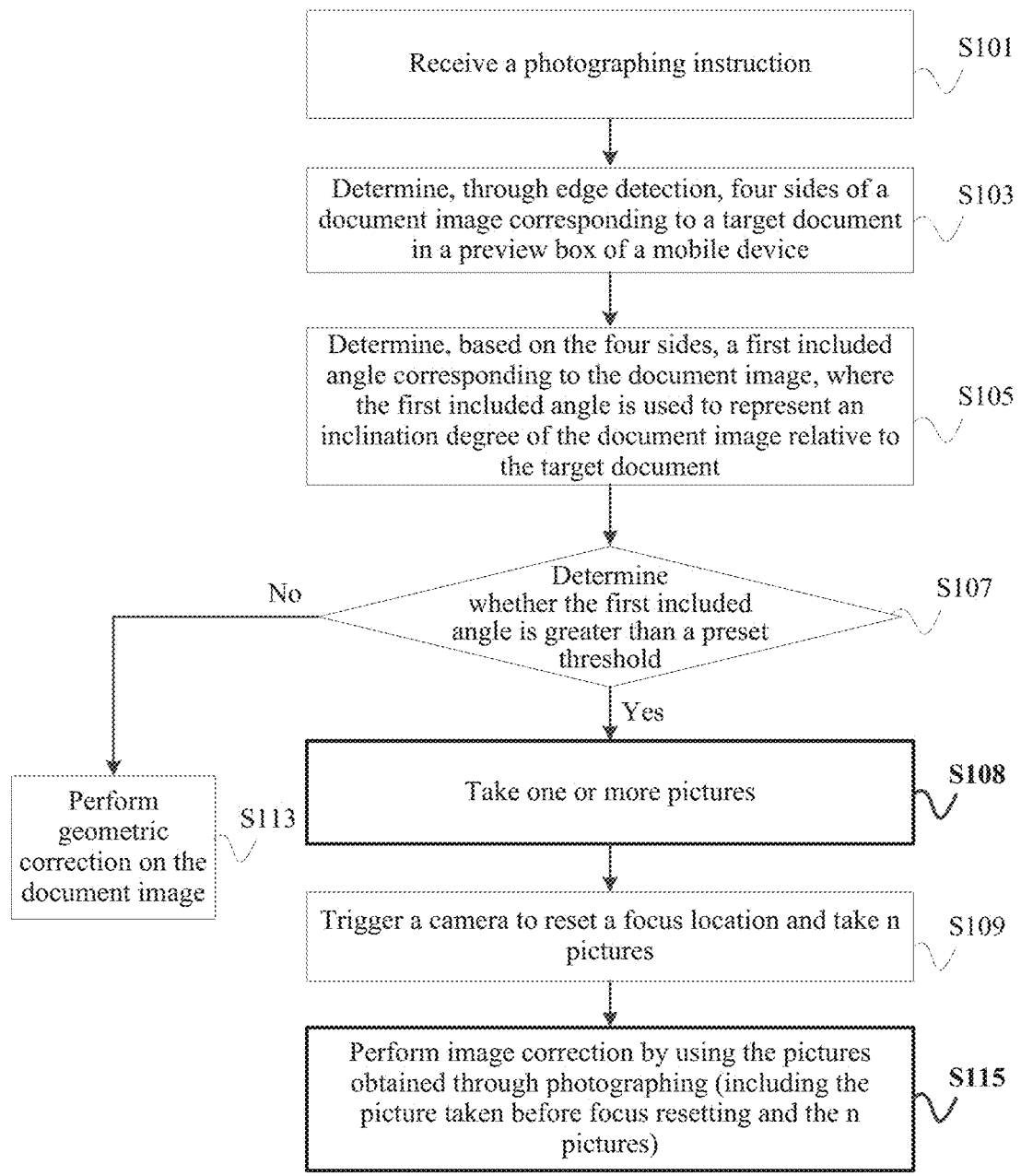
FIG. 11 is a schematic flowchart of another processing method according to an embodiment of the present invention.

In some embodiments, as shown in FIG. 11, before resetting the location of the photographing focus, the mobile device may further take one or more pictures. Reference may be made to step S108. In this case, the photographing focus is usually set at an image center by default. Then, after the location of the photographing focus is reset, n (n=1 or n≥2) pictures are taken. Finally, image correction may be applied based on the pictures obtained through photographing (including the picture taken before focus resetting and the n pictures), as described in step S105. The image correction step described in step S105 is not only used for restoring the geometric ratio of the document image, but also used for further improving the far-end definition of the document image by using the image processing method shown in FIG. 9. The following provides detailed descriptions. Step S105 may include the following steps:

Step 1: Apply geometric correction to at least two of the pictures obtained through photographing (including the picture taken before focus resetting and the n pictures).

Step 2: Divide, into m image blocks, each of the at least two pictures to which geometric correction has been applied, where m≥2, and m is a positive integer.

Step 3: With respect to a same image block, select, from the at least two pictures, an image block with highest definition as a to-be-spliced image block.

Finally, m selected to-be-spliced image blocks are spliced into one picture, and the picture obtained through splicing is used as the output in response to the photographing instruction.

It can be understood that, because a picture has been taken before the photographing focus is reset, near-end definition of the picture taken before the photographing focus is reset is not affected by focus moving, and the definition is quite high. Therefore, when the image segmentation and image splicing operations are performed by using all the pictures obtained through photographing (including the picture taken before focus resetting and the n pictures), a to-be-spliced image block of the near-end content may be selected from the picture taken before focus resetting. In this way, near-end definition of a picture obtained through splicing is not affected by focus moving.

In some embodiments, to further improve the far-end definition of the document image, the mobile device may alternatively perform, before applying geometric correction, image segmentation and image splicing operations on the pictures obtained through photographing (including the picture taken before focus resetting and the n pictures), then apply geometric correction to one picture obtained through splicing, and use, as the output in response to the photographing instruction, the picture to which geometric correction has been applied.

In implementation of the embodiment in FIG. 4 or FIG. 11, during photographing of the target document, if a relatively large inclination angle is found between the image plane of the camera and the target document through analysis, the camera is triggered to move the photographing focus toward the far-end content in the document image and take a picture, and finally, geometric correction is applied to the picture obtained through photographing, to obtain a corrected document image. The foregoing solution can significantly increase the definition of the far-end content in the document image, and improve correction quality of the document image.

Figure 12:
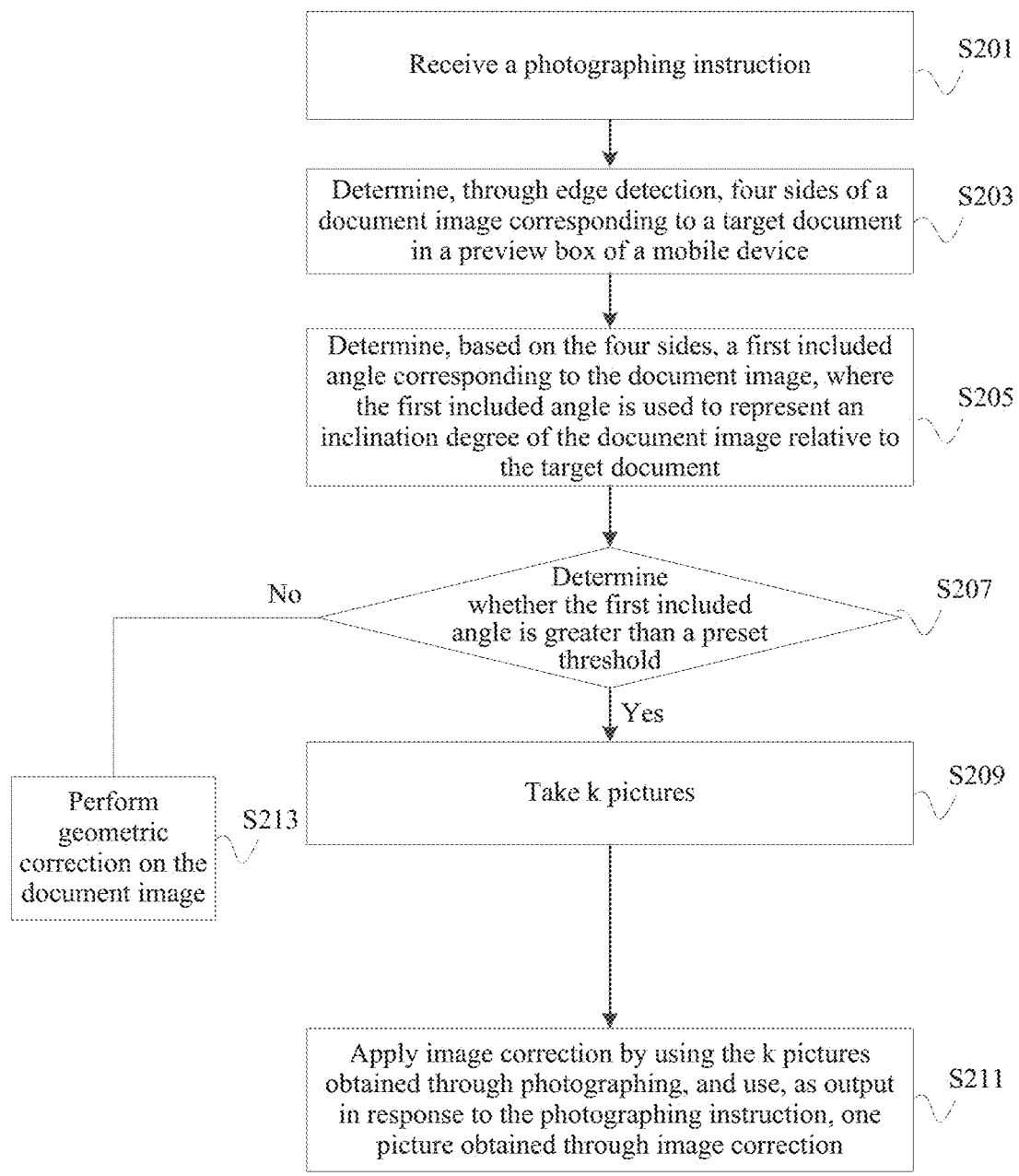
FIG. 12 is a schematic flowchart of still another processing method according to an embodiment of the present invention.

FIG. 12 shows another processing method according to an embodiment of the present invention. In the embodiment in FIG. 12, during photographing of a target document, if a relatively large inclination angle is found between an image plane of a camera and the target document through analysis, the camera is triggered to enter the preset photographing mode described in the foregoing Solution 2. Steps S201 to S213 are performed by a mobile device or at least one processor in a mobile device. The mobile device includes but is not limited to a mobile phone, a camera, a wearable device, or a network camera. The following provides descriptions by using an example in which the mobile device is an execution body.

S201: The mobile device receives a photographing instruction.

S203: The mobile device determines, through edge detection, four sides $k_1$, $k_2$, $k_3$, and $k_4$ of a document image corresponding to the target document in a preview box of the mobile device.

S205: The mobile device determines, based on the four sides, a first included angle corresponding to the document image, where the first included angle may be used to represent an inclination degree of the document image relative to the target document. Specifically, the first included angle is positively correlated with a photographing inclination angle. The photographing inclination angle is an inclination angle of the image plane of the camera relative to the target document. Referring to content in FIG. 2A and FIG. 2B, it can be learned that the image plane of the camera is a plane on which the document image is located, and the photographing inclination angle is the included angle $\alpha$ in FIG. 2A and FIG. 2B.

For specific implementation of determining the first included angle, refer to related content in the embodiment in FIG. 4. Details are not described herein again.

S207: The mobile device determines whether the first included angle is greater than a preset threshold. Specifically, if the first included angle is greater than the preset threshold, execution of step S209 is triggered; if the first included angle is not greater than the preset threshold, execution of step S213 is triggered.

S209: The mobile device takes k pictures, where k≥2, and k is a positive integer. In this case, a photographing focus is usually set at an image center by default, or may be set at another location. This is not limited herein.

S211: The mobile device applies image correction by using the k pictures (k≥2) obtained through photographing, and uses, as output in response to the photographing instruction, a picture obtained through image correction. Herein, image correction is used for improving far-end definition of the document image, so that far-end definition of the picture obtained through image correction is higher than the far-end definition of the document image obtained by the camera in step S203.

For specific implementation of performing image correction by using a plurality of (k) pictures, refer to FIG. 9 and related content. Details are not described herein again.

Specifically, image correction can not only restore a geometric ratio of the document image, but also improve the far-end definition of the document image.

S213: The mobile device applies geometric correction to the document image. For specific implementation of geometric correction, refer to FIG. 2 and related content.

It can be understood that, when step S209 is performed, slight jitter of the camera causes the k pictures obtained through photographing to present different far-end definition. Far-end content of some of the pictures is clearer. Therefore, when image segmentation and image splicing operations are performed by using the k pictures obtained through photographing, an image block with highest definition may be selected from the k pictures as a to-be-spliced image block. This can improve definition of far-end content in the document image.

It should be noted that the mobile device in steps S201 to S213 may be replaced by a processor in the mobile device, and details are not described herein.

It should be noted that, for content not mentioned in the embodiment in FIG. 12, refer to the foregoing embodiments. Details are not described herein again.

The following describes a mobile device provided in an embodiment of the present invention. The mobile device may be a smart digital camera, or a mobile device having an image acquisition function, for example, a mobile phone; may be a network camera apparatus, for example, an IP camera; or may be another device having an image acquisition function. Referring to FIG. 2, the mobile device 100 may include a camera 20, a main processor 101, a memory 102 (one or more computer readable storage media), an input/output system 30, an external storage system 40, and a communications module 50. All the parts shown in the figure may communicate over one or more communications buses 114, for example, an I2C bus or GPIO.

The camera 20 may include a lens 21, an imaging part 23, and an image signal processor (ISP: Image Signal Processor) 25. The imaging part 23 converts, into an electrical signal, an optical image captured by the lens 21. The image signal processor 25 is configured to convert, into a digital signal, the electrical signal that is input from the imaging part 23, perform further image processing on the converted-to digital signal, and then transmit the processed digital signal to the main processor 101 by using a camera interface 29. In some embodiments, the image signal processor 27 may alternatively be integrated into the main processor 101. In some embodiments, the camera 20 may further include a lens drive part 25, configured to move the lens 21 to adjust a location of a photographing focus. In specific implementation, the lens drive part 25 may be a voice coil motor (VCM: Voice Coil Motor), or may be a closed loop motor, an alternate motor, an OIS (optical image stabilization, English: Optical Image Motor) motor, or the like.

The input/output system 30 is mainly configured to implement a function of interaction between the mobile device 100 and a user/an external environment. In specific implementation, the input/output system 30 may include but is not limited to: a user input interface 107; a keyboard 115, a mouse 116, a touchscreen 117, and an audio frequency circuit 118 that are connected to the user input interface 107, for example, a user input apparatus such as a microphone; a peripheral output interface 108; and a display 119 and the audio frequency circuit 118 that are connected to the peripheral output interface 108, for example, an output apparatus such as a loudspeaker.

The external storage system 40 is mainly configured to provide removable external storage for the mobile device 100, to meet a flexible storage requirement of a user. In specific implementation, the external storage system 40 may include but is not limited to: an external storage interface 106, and a removable storage device, such as an SD memory card 112, a magnetic disk 113, and a USB flash drive 114, connected to the external storage interface 106. In actual use, a user may transfer data between the mobile device 100 and an external storage device. For example, the user stores, into the external storage device, a picture taken by the camera 20. For another example, the user transfers a picture in the external storage device to the mobile device 100, and may view the picture by using the display 119.

The communications module 50 is configured to communicate with an external communications device. In specific implementation, the communications module 50 may include but is not limited to a network interface 105, and a Wi-Fi module 111 connected to the network interface 105. The network interface 105 may support a wireless network protocol such as 802.11. In actual application, the communications module 50 may further include another communications part. For example, in an embodiment in which the mobile device 100 is a mobile phone, the communications module 50 may further include a mobile communications module, for example, a 3G communications module.

The main processor 101 may integrate and include one or more CPUs, a clock module, and a power management module. The clock module is mainly configured to generate, for the main processor 101, a clock required for data transmission and time sequence control. The power management module is mainly configured to provide stable and high-precision voltage for the main processor 101, the camera 20, the communications module 50, and the input/output system 30.

The memory 102 is coupled to the main processor 101, and is configured to store various software programs and/or multiple groups of instructions, and program data. In specific implementation, the memory 102 may include a high-speed random access memory, and may also include a nonvolatile memory. The memory 102 may further store an operating system, for example, an embedded operating system such as Android, iOS, Windows, or Linux.

Figure 14A:
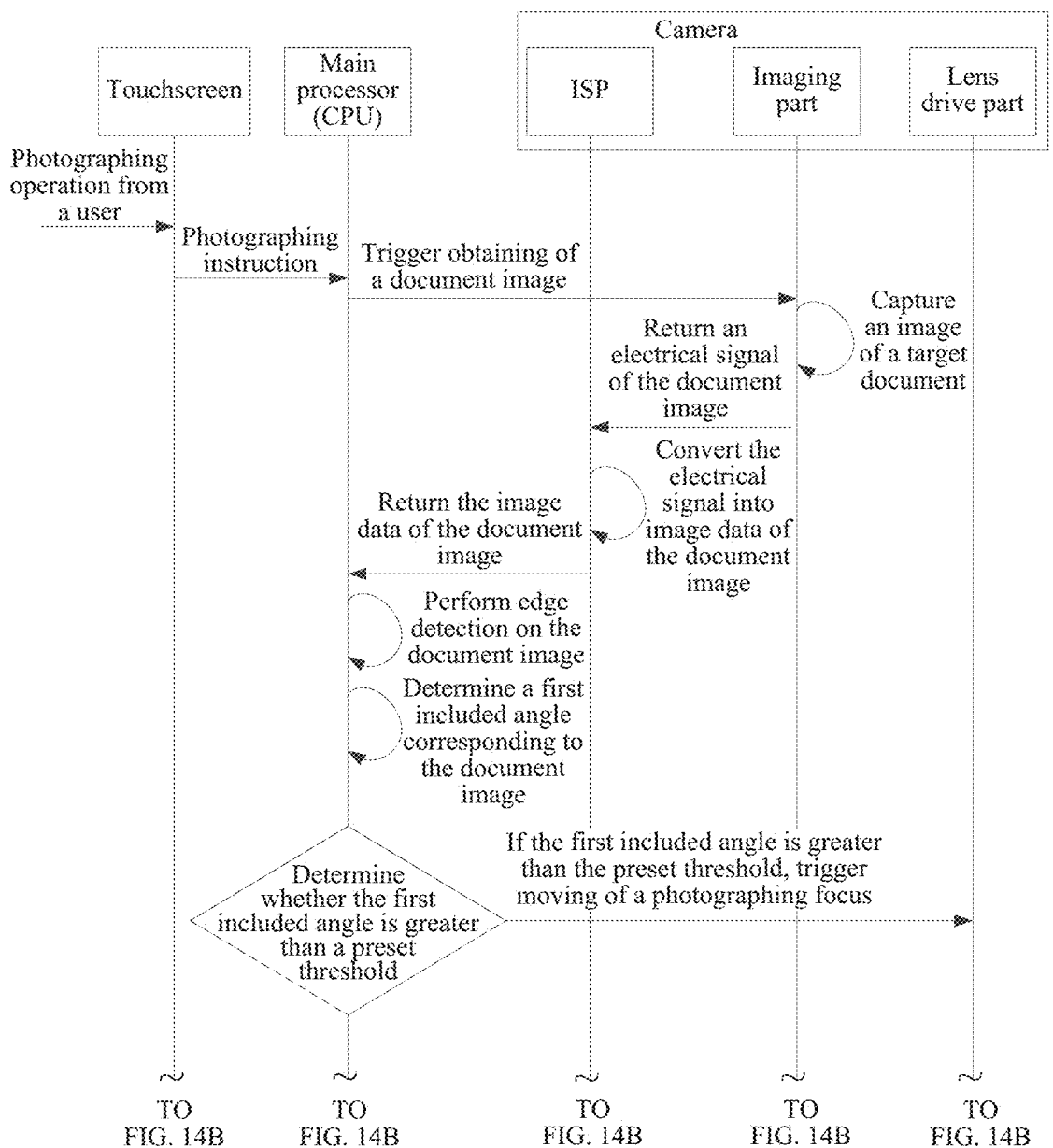
FIG. 14 is a schematic diagram of cooperative interaction of parts in the mobile device according to the embodiment in FIG. 13.
Figure 14B:
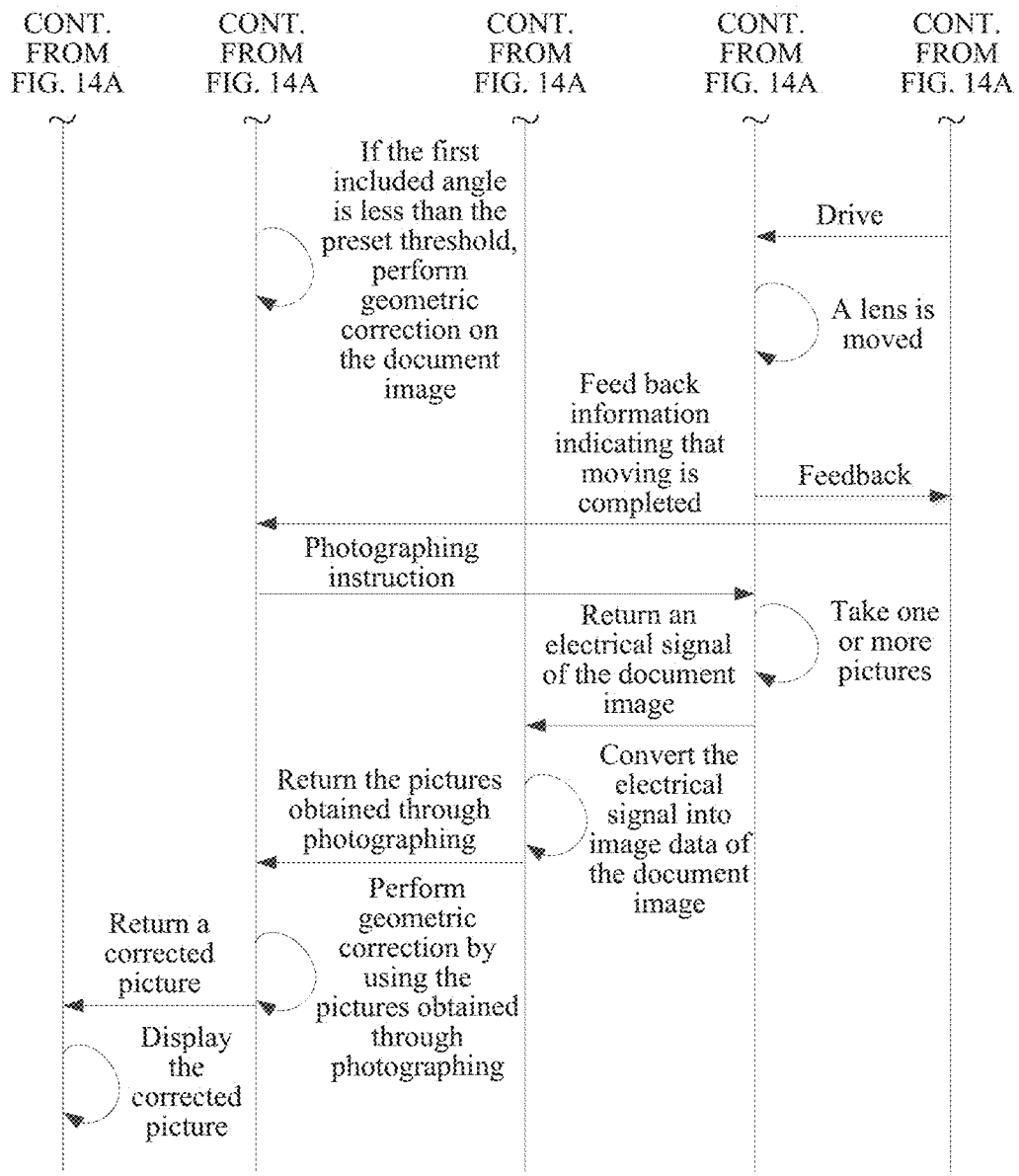

The following describes in detail a collaboration relationship between the foregoing parts in the embodiments of the present invention. Reference may be made to FIG. 14.

Step 1: A main processor receives a photographing instruction from a touchscreen. In specific implementation, a user may touch, on the touchscreen, a virtual button used to simulate "photographing", to generate the photographing instruction. It should be noted that the photographing instruction may alternatively come from another part, for example, a physical button used for photographing. This is not limited herein.

Step 2: The main processor triggers a camera to capture a document image of a target document. Specifically, an imaging part in the camera captures the document image of the target document, and outputs an electrical signal of the document image to an ISP in the camera.

Step 3: The ISP converts, into image data of the document image, the electrical signal that is input by the camera, and sends the image data to the main processor.

Step 4: The main processor performs edge detection on the document image, to identify four sides of the document image that is possibly presented as an arbitrary quadrilateral.

Step 5: The main processor determines, based on the four sides identified through edge detection, a first included angle corresponding to the document image.

Step 6: The main processor determines whether the first included angle is greater than a preset threshold; and if the first included angle is greater than the preset threshold, triggers a lens drive part, for example, a voice coil motor, to move a lens in the camera to adjust a location of a photographing focus; or if the first included angle is less than the preset threshold, directly applies geometric correction to the document image, to restore a geometric ratio of the document image.

Step 7: The lens drive part drives the lens to move, and notifies the main processor after moving is completed.

Step 8: The main processor sends the photographing instruction to the camera, to trigger the camera to take one or more pictures. Specifically, the imaging part in the camera captures the document image of the target document, and outputs an electrical signal of the document image to the ISP in the camera.

Step 9: The ISP generates image data of the one or more pictures, and returns the image data of the one or more pictures to the main processor.

Step 10: The main processor may apply geometric correction by using the one or more pictures obtained through photographing.

Finally, the main processor may display a corrected document image by using the touchscreen.

It should be noted that an inter-part collaboration process described in FIG. 14 is corresponding to the method embodiment in FIG. 4. For the method embodiments in FIG. 11 and FIG. 12, proper adjustment (addition, deletion, or change) may be performed on some interaction processes in FIG. 14, to adapt to a plurality of implementations.

For example, for the method embodiment in FIG. 11, in the foregoing step 6, if the main processor determines that the first included angle is greater than the preset threshold, the main processor may first trigger the ISP to take one or more pictures, and then trigger the lens drive part to move the lens in the camera.

For example, for the method embodiment in FIG. 12, because the location of the photographing focus does not need to be reset, the lens drive part in FIG. 14 may not be used. In addition, in the foregoing step 6, if the main processor determines that the first included angle is greater than the preset threshold, the main processor triggers the ISP to obtain a plurality of pictures, and no longer triggers the lens drive part to move the lens to adjust the focus location. In addition, the foregoing step 7 needs to be deleted to adapt to the method embodiment in FIG. 12.

It should be noted that, for a definition of the first included angle, specific implementation of determining the first included angle, and specific implementation of performing image correction by using the one or more pictures, reference may be made to the foregoing method embodiments. Details are not described herein again.

Figure 13:
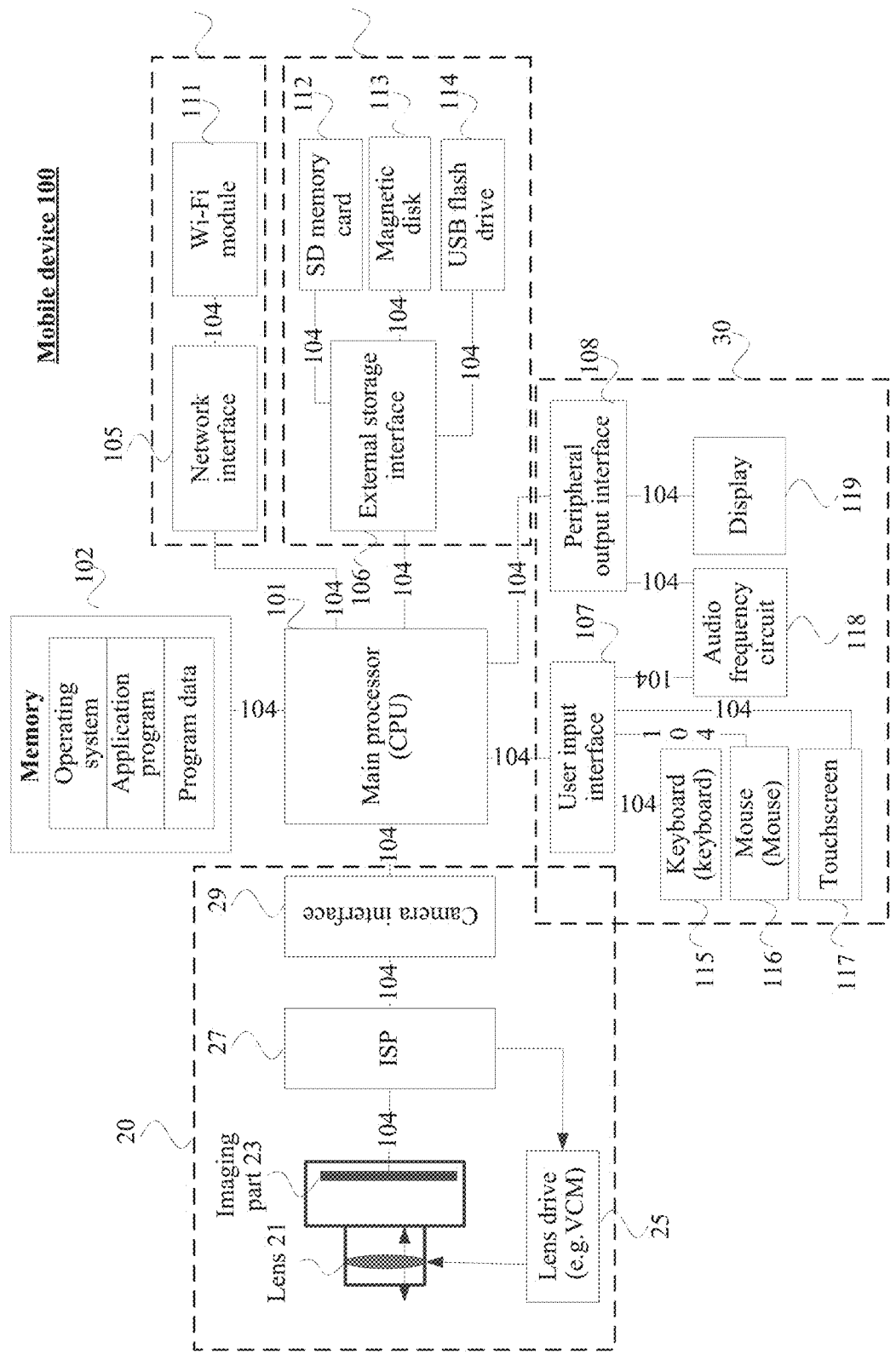
FIG. 13 is a schematic structural diagram of a mobile device according to an embodiment of the present invention.

It should be noted that FIG. 13 is merely an implementation of this embodiment of the present invention. In actual application, the mobile device 100 may alternatively include more or fewer parts. This is not limited herein.

Figure 15:
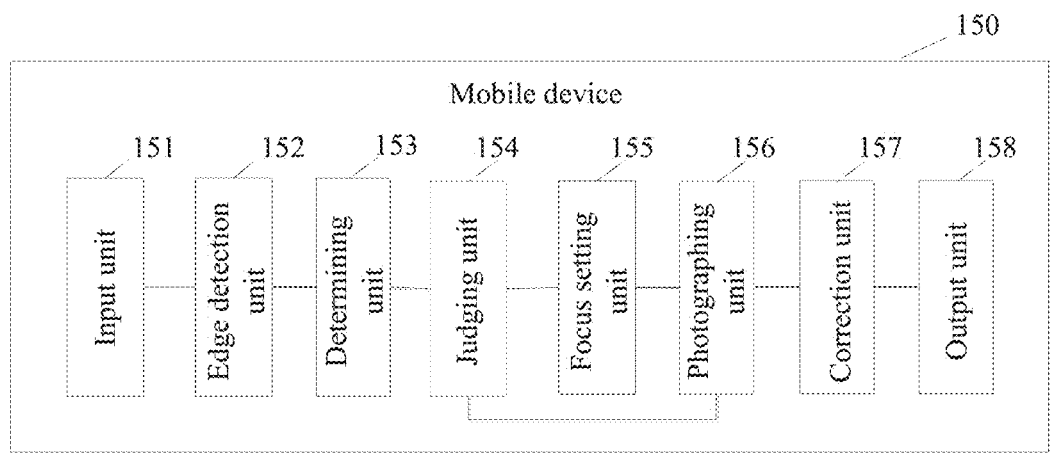
FIG. 15 is a schematic structural diagram of another mobile device according to an embodiment of the present invention.

FIG. 15 is a schematic structural diagram of a mobile device according to an embodiment of the present invention. The mobile device may be a smart digital camera, or a mobile device having an image acquisition function, for example, a mobile phone; may be a network camera apparatus, for example, an IP camera; or may be another device having an image acquisition function. The mobile device is configured to implement the processing method described in the foregoing method embodiment. As shown in FIG. 15, the mobile device 150 may include an input unit 151, an edge detection unit 152, a determining unit 153, a judging unit 154, a focus setting unit 155, a photographing unit 156, and a correction unit 157.

The input unit 151 is configured to receive a photographing instruction. Specifically, the photographing instruction is used to trigger the photographing unit 156 to photograph a target document.

The edge detection unit 152 is configured to identify, through edge detection, four sides $k_1$, $k_2$, $k_3$, and $k_4$ of a document image corresponding to the target document.

The determining unit 153 is configured to determine, based on the four sides, a first included angle corresponding to the document image. The first included angle is used to represent an inclination degree of the document image relative to the target document. The first included angle is positively correlated with an inclination angle of an image plane of a camera relative to the target document.

The judging unit 154 is configured to determine whether the first included angle is greater than a preset threshold. If determining that the first included angle is greater than the preset threshold, the judging unit 154 triggers the focus setting unit 155 to reset a focus location in a direction close to far-end content in the document image, and triggers the photographing unit 156 to take n (n is a positive integer) pictures. Specifically, the focus setting unit 155 may be configured to set the focus location. The photographing unit 156 is configured to take the n pictures.

The correction unit 157 is configured to apply geometric correction by using the picture obtained through photographing by the photographing unit 156.

An output unit 158 is configured to use, as output in response to the photographing instruction, a picture obtained through correction performed by the correction unit 157.

Specifically, for a definition of the first included angle and specific implementation of determining the first included angle by the determining unit 153, refer to the foregoing method embodiment. Details are not described herein again.

In an embodiment, after the focus setting unit 155 resets the focus location, the photographing unit 156 may take one picture (n=1). Then, the correction unit 157 applies geometric correction by using the picture obtained through photographing, to restore a geometric ratio of a document image in the picture. For specific implementation of geometric correction, refer to content described in FIG. 3. Details are not described herein again. It can be understood that, because the picture is taken after the focus location is reset, far-end definition of the document image is improved.

In an embodiment, after the focus setting unit 155 resets the focus location, the photographing unit 156 may take a plurality of pictures (n≥2). The correction unit 157 applies geometric correction by using the plurality of pictures obtained through photographing. Then, the correction unit 157 may further perform image processing shown in FIG. 9 on the plurality of pictures to which geometric correction has been applied. For details, refer to FIG. 9 and related descriptions. Details are not described herein again. This can not only restore a geometric ratio of the document image, but also further improve the far-end definition of the document image.

To avoid impairment of near-end definition of the document image while improving the far-end definition of the document image, the photographing unit 156 may have the following several implementations.

In some embodiments, the photographing unit 156 may be specifically configured to sequentially obtain, through photographing, the n (n≥2) pictures in a process in which the focus setting unit 155 moves a photographing focus. When a picture is taken at an initial moment of focus moving, the focus is still relatively close to near-end content, and image definition near the near-end content is still relatively high.

Therefore, when image segmentation and image splicing operations are performed on the n pictures, a to-be-spliced image block of the near-end content may be selected from the picture taken at the initial moment. In this way, near-end definition of a picture obtained through splicing is less affected by focus moving.

In some embodiments, the photographing unit 156 may be specifically configured to take one or more pictures before the focus setting unit 155 resets the location of a photographing focus. Near-end definition of the picture taken before the photographing focus is reset is not affected by focus moving. Therefore, when image segmentation and image splicing operations are performed by using all the pictures obtained through photographing (including the picture taken before focus resetting and the n pictures), a to-be-spliced image block of the near-end content may be selected from the picture taken before focus resetting. In this way, near-end definition of a picture obtained through splicing is not affected by focus moving.

In an embodiment of another processing method provided in the embodiments of the present invention, if determining that the first included angle is greater than the preset threshold, the judging unit 154 may trigger the photographing unit 156 to take k (k≥2, and k is a positive integer) pictures. Correspondingly, the correction unit 157 may be configured to apply geometric correction by using the k pictures obtained through photographing by the photographing unit 156. Then, the correction unit 157 may further perform image processing shown in FIG. 9 on the plurality of pictures to which geometric correction has been applied. For details, refer to FIG. 9 and related descriptions. Details are not described herein again.

It can be understood that, when the photographing unit 156 takes the k pictures, slight jitter of the camera causes the k pictures obtained through photographing to present different far-end definition. Far-end content of some of the pictures is clearer. Therefore, when the correction unit 157 performs image segmentation and image splicing operations by using the plurality of pictures obtained through photographing, an image block with highest definition may be selected from the plurality of pictures as a to-be-spliced image block. This can improve definition of far-end content in the document image.

For specific implementation of performing image correction by the correction unit 157 by using one or more pictures, and other content unmentioned in the embodiment in FIG. 15, refer to the foregoing method embodiments. Details are not described herein again.

To sum up, according to the embodiments of the present invention, during photographing of the target document (to-be-photographed object), if a relatively large inclination angle is found between the image plane of the camera and the target document through analysis, the camera is triggered to enter the preset photographing mode described in the foregoing Solution 1 or Solution 2, and finally, image correction is performed by using the picture obtained through photographing. The preset photographing mode is used to improve a document image far-end fuzziness status caused by the relatively large inclination angle. The foregoing solution can significantly increase the definition of the far-end content in the document image, and improve correction quality of the document image.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a magnetic disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus configured to implement a specified function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operation steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Apparently, a person skilled in the art may make various modifications and variations to the present invention without departing from the spirit and scope of the present invention. Therefore, the present invention is intended to cover these modifications and variations provided that these modifications and variations of the present invention fall within the scope of the claims of the present invention and equivalent technologies thereof.

What is claimed is:

1. A processing method, applied to an electronic device, the processing method comprising:
   receiving a photographing instruction;
   determining, through edge detection, four sides of a document image corresponding to a target document in a preview box of the electronic device;
   determining, based on a set of ratios calculated using the four sides or based on a set of angles calculated using the four sides, a first included angle corresponding to the document image, wherein the first included angle represents an inclination degree of the document image relative to the target document, and wherein the first included angle is positively correlated with an inclination angle of an image plane of a camera relative to the target document;

triggering the camera to reset a focus location in a direction of far-end content in the document image and taking n pictures when the first included angle is greater than a preset threshold, wherein n is an integer greater than or equal to one;

applying geometric correction to at least one of the n pictures; and outputting, in response to the photographing instruction, the at least one of the n pictures to which the geometric correction has been applied.

2. The processing method of claim 1, wherein when the first included angle is determined based on the set of ratios, determining the first included angle comprises:

obtaining lengths $k_1$, $k_2$, $k_3$, and $k_4$ of the four sides, wherein $k_1$ and $k_3$ correspond to opposite sides, wherein $k_1/k_3 \geq$ one, wherein $k_2$ and $k_4$ correspond to opposite sides, and wherein $k_2/k_4 \geq$ one;

calculating side ratios of two pairs of opposite sides, wherein side ratios are $k_1/k_3$ and $k_2/k_4$;

determining either $k_1$ as a main side when $k_1/k_3$ is greater than $k_2/k_4$ or $k_2$ as the main side when $k_2/k_4$ is greater than $k_1/k_3$; and determining, as the first included angle, an included angle formed by intersection of two lateral sides of the main side.

3. The processing method of claim 1, wherein when the first included angle is determined based on the set of angles, determining the first included angle comprises:

obtaining lengths $k_1$, $k_2$, $k_3$, and $k_4$ of the four sides, wherein $k_1$ and $k_3$ correspond to opposite sides, and wherein $k_2$ and $k_4$ correspond to opposite sides;

calculating a second included angle formed between $k_1$ and $k_3$ and a third included angle formed between $k_2$ and $k_4$; and determining, as the first included angle, a larger of the second included angle and the third included angle.

4. The processing method of claim 3, wherein n≥two, and wherein triggering the camera to reset the focus location in the direction of the far-end content in the document image and taking the n pictures comprises:

moving a photographing focus in the direction of the far-end content in the document image; and obtaining the n pictures through photographing.

5. The processing method of claim 3, wherein n≥two, and wherein triggering the camera to reset the focus location in a direction of the far-end content in the document image and taking the n pictures comprises:

moving a photographing focus t times in the direction of the far-end content in the document image; and taking at least one picture each time after moving the photographing focus, wherein t is an integer greater than or equal to one and less than or equal to n.

6. The processing method of claim 5, wherein before triggering the camera to reset the focus location in the direction of the far-end content in the document image, the processing method further comprises taking at least one picture.

7. The processing method of claim 1, wherein triggering the camera to reset the focus location in the direction of the far-end content in the document image comprises:

calculating an angle difference between the first included angle and the preset threshold;

determining a moving distance of a photographing focus based on the angle difference; and moving the photographing focus in the direction of the far-end content in the document image by the moving distance.

8. A processing method, applied to a mobile device, the processing method comprising:

receiving a photographing instruction;

determining, through edge detection, four sides of a document image corresponding to a target document in a preview box of the mobile device;

determining, based on a set of ratios calculated using the four sides or based on a set of angles calculated using the four sides, a first included angle corresponding to the document image, wherein the first included angle represents an inclination degree of the document image relative to the target document, and wherein the first included angle is positively correlated with an inclination angle of an image plane of a camera relative to the target document;

triggering the camera to take k pictures when the first included angle is greater than a preset threshold, wherein k≥two, and wherein k is a positive integer;

applying image correction to the k pictures obtained through photographing; and outputting, in response to the photographing instruction, one picture obtained through the image correction, wherein far-end content in the picture obtained through the image correction is clearer than far-end content in the document image.

9. The processing method of claim 8, wherein when the first included angle is determined based on the set of ratios, determining the first included angle comprises:

obtaining lengths $k_1$, $k_2$, $k_3$, and $k_4$ of the four sides, wherein $k_1$ and $k_3$ correspond to opposite sides, wherein $k_1/k_3 \geq$ one, wherein $k_2$ and $k_4$ correspond to opposite sides, and wherein $k_2/k_4 \geq$ one;

calculating side ratios of two pairs of opposite sides, wherein side ratios are $k_1/k_3$ and $k_2/k_4$;

determining either $k_1$ as a main side when $k_1/k_3$ is greater than $k_2/k_4$ or $k_2$ as the main side when $k_2/k_4$ is greater than $k_1/k_3$; and determining, as the first included angle, an included angle formed by intersection of two lateral sides of the main side.

10. The processing method of claim 8, wherein when the first included angle is determined based on the set of angles, determining the first included angle comprises:

obtaining lengths $k_1$, $k_2$, $k_3$, and $k_4$ of the four sides, wherein $k_1$ and $k_3$ correspond to opposite sides, and wherein $k_2$ and $k_4$ correspond to opposite sides;

calculating a second included angle formed between $k_1$ and $k_3$ and a third included angle formed between $k_2$ and $k_4$; and determining, as the first included angle, a larger of the second included angle and the third included angle.

11. The processing method of claim 10, wherein applying the image correction to the k pictures comprises:

applying geometric correction to at least two of the k pictures;

dividing, into m image blocks, each of the at least two of the k pictures to which the geometric correction has been applied, wherein m≥two, and wherein m is a positive integer;

selecting, with respect to a same image block from the at least two of the k pictures, an image block with a highest definition as a to-be-spliced image block;

performing image splicing on m selected to-be-spliced image blocks; and setting, as an output, one picture obtained through splicing.

12. The processing method of claim 10, wherein applying the image correction to the k pictures comprises:
- dividing each of at least two of the k pictures into m image blocks, wherein m≥two, and wherein m is a positive integer;
- selecting, with respect to a same image block from the at least two of the k pictures, an image block with highest definition as a to-be-spliced image block;
- performing image splicing on m selected to-be-spliced image blocks;
- obtaining one picture through splicing;
- applying geometric correction to the one picture; and
- outputting the one picture to which the geometric correction has been applied in response to the photographing instruction.

13. A mobile device, comprising:
- a button configured to receive a photographing instruction;
- a camera coupled to the button and configured to obtain a document image of a target document; and
- a processor coupled to the button and the camera and configured to:
  - determine, through edge detection, four sides of the document image corresponding to the target document in a preview box of the mobile device;
  - determine, based on a set of ratios calculated using the four sides or based on a set of angles calculated using the four sides, a first included angle corresponding to the document image, wherein the first included angle represents an inclination degree of the document image relative to the target document, and wherein the first included angle is positively correlated with an inclination angle of an image plane of the camera relative to the target document;
  - determine whether the first included angle is greater than a preset threshold;
  - trigger the camera to reset a focus location in a direction of far-end content in the document image and take n pictures, wherein the first included angle is greater than the preset threshold, and wherein n is an integer greater than or equal to one;
  - apply geometric correction to at least one of the n pictures obtained through photographing; and
  - output, in response to the photographing instruction, the at least one of the n pictures to which the geometric correction has been applied.

14. The mobile device of claim 13, wherein the n≥two, and wherein the camera is further configured to:
- move a photographing focus in the direction of the far-end content in the document image; and
- obtain the n pictures through photographing.

15. The mobile device of claim 13, wherein n≥two, and wherein the camera is further configured to:
- move a photographing focus t times in the direction of the far-end content in the document image; and
- take at least one picture each time after moving the photographing focus, wherein t is an integer greater than or equal to one and less than or equal to n.

16. The mobile device of claim 15, wherein the camera is further configured to take at least one picture before resetting the focus location in a direction of the far-end content in the document image.

17. The mobile device of claim 13, wherein the button comprises a virtual button or a physical button.

18. A mobile device, comprising:
- a button configured to receive a photographing instruction;
- a camera coupled to the button and configured to obtain a document image of a target document;
- a processor coupled to the button and the camera and configured to:
  - determine, through edge detection, four sides of the document image corresponding to the target document in a preview box of the mobile device;
  - determine, based on a set of ratios calculated using the four sides or based on a set of angles calculated using the four sides, a first included angle corresponding to the document image, wherein the first included angle represents an inclination degree of the document image relative to the target document, and wherein the first included angle is positively correlated with an inclination angle of an image plane of the camera relative to the target document;
  - determine whether the first included angle is greater than a preset threshold;
  - trigger the camera to take k pictures, wherein the first included angle is greater than the preset threshold, wherein k≥two, and wherein k is a positive integer;
  - apply image correction to the k pictures; and
  - output, in response to the photographing instruction, one picture obtained through the image correction, wherein far-end content in the picture obtained through the image correction is clearer than far-end content in the document image.

19. The mobile device of claim 18, wherein the processor is further configured to:
- apply geometric correction to the k pictures;
- divide, into m image blocks, each of the k pictures to which the geometric correction has been applied, wherein m≥two, and wherein m is a positive integer;
- select, with respect to a same image block from the k pictures, an image block with highest definition as a to-be-spliced image block;
- perform image splicing on m selected to-be-spliced image blocks; and
- set, as the output, one picture obtained through splicing.

20. The mobile device of claim 18, wherein the processor is further configured to:
- divide each of the k pictures into m image blocks, wherein m≥two, and wherein m is a positive integer;
- select, with respect to a same image block from the k pictures, an image block with highest definition as a to-be-spliced image block;
- perform image splicing on m selected to-be-spliced image blocks;
- obtain one picture obtained through splicing;
- apply geometric correction to the one picture; and
- output the one picture to which the geometric correction has been applied.

* * * * *